(12) United States Patent
Shimodaira et al.

(10) Patent No.: US 9,311,885 B2
(45) Date of Patent: Apr. 12, 2016

(54) IMAGE COLOR ESTIMATION METHOD, IMAGE COLOR ESTIMATION DEVICE, AND IMAGE COLOR ESTIMATION PROGRAM

(75) Inventors: Yoshifumi Shimodaira, Hamamatsu (JP); Katsuya Ono, Hamamatsu (JP)

(73) Assignee: NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 181 days.

(21) Appl. No.: 13/989,978

(22) PCT Filed: Nov. 30, 2011

(86) PCT No.: PCT/JP2011/077687
§ 371 (c)(1),
(2), (4) Date: Aug. 9, 2013

(87) PCT Pub. No.: WO2012/074014
PCT Pub. Date: Jun. 7, 2012

(65) Prior Publication Data
US 2013/0328911 A1 Dec. 12, 2013

(30) Foreign Application Priority Data

Nov. 30, 2010 (JP) ................. P2010-267389

(51) Int. Cl.
*G09G 5/02* (2006.01)
*H04N 1/60* (2006.01)
(Continued)

(52) U.S. Cl.
CPC ............... *G09G 5/02* (2013.01); *H04N 1/603* (2013.01); *H04N 1/6027* (2013.01); *H04N 9/67* (2013.01); *H04N 9/68* (2013.01); *G09G 2320/0693* (2013.01); *G09G 2360/145* (2013.01)

(58) Field of Classification Search
CPC ....... G09G 5/02; G09G 5/06; G09G 2340/06; H04N 9/641; H04N 1/60; H04N 1/6002; G06T 11/001; G06T 15/04; G06T 15/005; G06T 19/00
USPC ......... 345/418, 581, 589, 600, 603, 604, 605, 345/606
See application file for complete search history.

(56) References Cited

U.S. PATENT DOCUMENTS 7,084,881 B1 * 8/2006 Chen et al. .................... 345/589
2005/0128497 A1 * 6/2005 Hirashima et al. ............. 358/1.9
(Continued)

FOREIGN PATENT DOCUMENTS

JP 08-294009 11/1996
JP 2005-128254 5/2005
(Continued)

OTHER PUBLICATIONS

Toshiyuki Wakebe et al., "Color Reproduction Method Reducing Reproduction Error Induced by Color Tracking, Device Drift and Imperfect Additivity", IEICE Technical Report, vol. 105, No. 617, (EID2005 78-87), Feb. 17, 2006, p. 37-40.
(Continued)

*Primary Examiner* — Xiao Wu
*Assistant Examiner* — Sarah Lhymn
(74) *Attorney, Agent, or Firm* — Ostrolenk Faber LLP

(57) ABSTRACT

In an image color estimation method, a signal value SG (Rs, Gs, Bs) is calculated based on a first display property and a tone value T (S121), and an offset value Co (Ro, Go, Bo) that corresponds to the respective components (Rs, Gs, Bs) in the signal value SG is calculated based on the first display property P1, a second display property P2, and the tone value T (R, G, B) (S122). Then, a correction signal value SC (Rc, Gc, Bc) is calculated by adding the offset value Co (Ro, Go, Bo) to the signal value SG (Rs, Gs, Bs) (S123). The correction signal value SC (Rc, Gc, Bc) is converted into a correction signal value ST (Xc, Yc, Zc) using a conversion matrix M (S124).

6 Claims, 12 Drawing Sheets

(51) Int. Cl.
*H04N 9/67* (2006.01)
*H04N 9/68* (2006.01)

(56) References Cited

U.S. PATENT DOCUMENTS

| | | | | |
|---|---|---|---|---|
| 2005/0244072 A1* | 11/2005 | Imai | ............................. | 382/254 |
| 2006/0050079 A1* | 3/2006 | Ben-Chorin et al. | ......... | 345/590 |
| 2006/0071937 A1 | 4/2006 | Tin | ................................ | 345/591 |
| 2010/0053222 A1* | 3/2010 | Kerofsky | ..................... | 345/690 |
| 2010/0302266 A1* | 12/2010 | Morita | .......................... | 345/559 |

FOREIGN PATENT DOCUMENTS

| | | |
|---|---|---|
| JP | 2005-208982 | 8/2005 |
| JP | 2008-515340 | 5/2008 |
| WO | WO 01/15129 | 3/2001 |

OTHER PUBLICATIONS

International Search Report mailed Mar. 6, 2012 in corresponding International Application No. PCT/JP2011/077687.

Dawn Wallner, "Building ICC Profiles—the Mechanics and Engineering", website of International Color Consortium, p. 150-167, 2000.

International Preliminary Report on Patentability (Chapter 1 of the PCT) issued Jun. 4, 2013 in corresponding International Application No. PCT/JP2011/077687.

Nobuhiko Tamura et al., "Calibration of LCD Colorimetry Considering Channel Interaction" The Journal of the Institute of Image Information and Television Engineers, 2002, vol. 56, No. 8, 2002, p. 1315-p. 1320.

\* cited by examiner

| | Color difference | | |
|---|---|---|---|
| | Mean | Maximum | Standard deviation |
| Comparative example | 4.80 | 9.99 | 1.83 |
| Embodiment | 0.63 | 1.47 | 0.26 |

(b)

| | Color difference | | |
|---|---|---|---|
| | Mean | Maximum | Standard deviation |
| Comparative example | 1.01 | 2.13 | 0.45 |
| Embodiment | 0.28 | 0.97 | 0.13 |

(c)

| | Color difference | | |
|---|---|---|---|
| | Mean | Maximum | Standard deviation |
| Comparative example | 2.54 | 6.30 | 1.20 |
| Embodiment | 0.48 | 1.46 | 0.22 |

(d)

| | Color difference | | |
|---|---|---|---|
| | Mean | Maximum | Standard deviation |
| Comparative example | 4.70 | 10.49 | 1.96 |
| Embodiment | 0.42 | 2.10 | 0.27 |

IMAGE COLOR ESTIMATION METHOD, IMAGE COLOR ESTIMATION DEVICE, AND IMAGE COLOR ESTIMATION PROGRAM

CROSS-REFERENCE TO RELATED APPLICATIONS

The present application is a 35, U.S.C. §§371, national phase conversion of PCT/JP2011/077687, filed Nov. 30, 2011, which claims priority to Japanese Patent Application No. 2010-267389, filed Nov. 30, 2010, the contents of which are incorporated herein by reference. The PCT International Application was published in the Japanese language.

TECHNICAL FIELD

The present invention relates to an image color estimation method for estimating an image color to be displayed on an image display device such as a display, an image color estimation device for estimating an image color, and an image color estimation program for estimating an image color.

BACKGROUND ART

To date, methods for calculating a display property of a display in which additive color mixture is not realized have been proposed. Patent Literature 1, describes a technique that relates to a display property calibration method for calibrating the display property of a color display device. Further, Patent Literature 2, describes a technique that relates to a measuring method for measuring the display property of a display. In addition, Patent Literature 3, describes a technique that relates to a system for creating a monitor profile. According to this technique, a monitor profile for carrying out a high-accuracy correction in accordance with the display property of individual monitors is created with ease.

CITATION LIST

Patent Literature

Patent Literature 1:, Japanese Patent Application Laid-Open No. 2005-128254
Patent Literature 2:, International Publication No. 01/015129
Patent Literature 3:, Japanese Patent Application Laid-Open No. 2005-208982

Non Patent Literature

Non Patent Literature 1:, Dawn Wallner, "Building ICC Profiles the Mechanics and Engineering." [online], The Sight of International Color Consortium. Accessed on Nov. 22, 2010. Internet <URL; http://www.color.org/icc-book1.pdf>

SUMMARY OF INVENTION

Technical Problem

Conventionally, there has been a strong demand for matching colors of both images when an image displayed on a display is printed. In order to meet this demand, there exists a color management system (CMS) as a method for carrying out color reproduction between distinct devices. With this CMS, color reproduction is carried out using a device-dependent color space and a device-independent color space (XYZ color space or Lab color space). In a display, color conversion is carried out between the RGB color space and the XYZ color space. Further, it is typical to carry out this color conversion using an ICC profile (Shaper Matrix Model (SMM)) (see Non Patent Literature 1). However, the SMM assumes a display in which additive color mixture is realized and color tracking does not occur. Due to this assumption, accurate color conversion cannot be carried out in a typical display. Thus, the aforementioned demand cannot be met.

Accordingly, the present invention provides an image color estimation method that makes it possible to estimate, with high accuracy, an image color of an image displayed on a display in which additive color mixture is not realized and color tracking occurs, an image color estimation device for estimating the image color, and an image color estimation program for estimating the image color.

Solution to Problem

An image color estimation method according to one aspect of the present invention is an image color estimation method for estimating a signal value (XYZ) of an XYZ colorimetric system that indicates a device-independent color of an image displayed on a display from a tone value (R, G, B) of an RGB color specification system inputted to the display and includes a first calculation step of calculating a signal value (Rs, Gs, Bs) of the RGB color specification system based on a first display property and the tone value (R, G, B), a second calculation step of calculating an offset value (Ro, Go, Bo) that corresponds to respective components (Rs, Gs, Bs) in the signal value based on the first display property, a second display property, and the tone value (R, G, B), a third calculation step of calculating a correction signal value (Rc, Gc, Bc) of the RGB color specification system by adding the offset value (Ro, Go, Bo) to the signal value (Rs, Gs, Bs), and a fourth calculation step of converting the correction signal value (Rc, Gc, Bc) into the signal value (Xc, Yc, Zc) using a conversion matrix; the first display property is a relationship between, in a case where at least one component in the tone value (R, G, B) is a variable component, the variable component in the tone value (R, G, B) and a component that corresponds to the variable component in the signal value (Rs, Gs, Bs); and the second display property is a relationship between, in a case where two invariable components in the tone value (R, G, B) are set to fixed values and a remaining variable component is varied, the variable component in the tone value (R, G, B) and a component that corresponds to the invariable component in the signal value (Rs, Gs, Bs).

According to this image color estimation method, each component in the image color is expressed as a sum of the output image signal value (Rs, Gs, Bs) and the offset value (Ro, Go, Bo). In a display in which additive color mixture is not realized and color tracking occurs, the output image signal value (Rs, Gs, Bs) in a case where the respective components of RGB are lit at the same time differs from a value obtained by synthesizing the output image signal value (Rs, Gs, Bs) in a case where the respective components of RGB are lit independently from one another. In this image color estimation method, the offset value is calculated based on the first display property, the second display property, and the tone value (R, G, B). Then, the output image signal value (Rs, Gs, Bs) can be corrected using this offset value. Accordingly, even with a display in which additive color mixture is not realized and color tracking occurs, an image color to be displayed on the display can be estimated with high accuracy based on the tone value (R, G, B) to be inputted to the display.

In the image color estimation method described above, the offset value (Ro, Go, Bo) is a function of the tone value (R, G, B) and may be a function expressed in Formula (1).

[Formula 1]

$$Co = \Delta Cs \cdot \left(\frac{C2}{C1}\right)^\alpha + \Delta C's \cdot \left(\frac{C3}{C1}\right)^\beta \quad (1)$$

In the above Formula (1), C1, represents a first component selected from the components in the tone value (R, G, B). C2 represents a second component, which is different from the first component, selected from the components in the tone value (R, G, B). C3, represents a third component, which is different from the first component and the second component, selected from the components in the tone value (R, G, B). In addition, ΔCs represents a numerical value calculated based on one first display property in a case where the first component is the invariable component and the second component is the variable component. ΔC's represents a numerical value calculated based on another first display property in a case where the first component is the invariable component and the third component is the variable component. Then, the coefficient α represents a coefficient of an approximation function for approximating one second display property. The coefficient β represents a coefficient of an approximation function for approximating another second display property.

According to the above Formula (1), a difference between a component that corresponds to the first component in the output image signal value (Rs, Gs, Bs) in a case where only the first component is lit and a component that corresponds to the first component in the output image signal value (Rs, Gs, Bs) in a case where the first component and the second component are lit can be calculated by a first term in the above Formula (1). In addition, a difference between a component that corresponds to the first component in the output image signal value (Rs, Gs, Bs) in a case where only the first component is lit and a component that corresponds to the first component in the output image signal value (Rs, Gs, Bs) in a case where the first component and the third component are lit can be calculated by a second term in the above Formula (1). Then, an offset value of the first component where the two differences are taken into consideration can be calculated. Accordingly, even with a display in which additive color mixture is not realized and color tracking occurs, an image color to be displayed on the display can be estimated with high accuracy based on the tone value (R, G, B) to be inputted to the display.

In the image color estimation method described above, the fourth step may further include a correction using a zero-bias value, and the zero-bias value may be a measurement value (Xk, Yk, Zk) of the XYZ colorimetric system displayed on the display in a case where the tone value (R, G, B) each component of which is 0, is inputted to the display. According to the above, an image color displayed on a display in a portion where an offset of an image color component is present with respect to the tone value (R, G, B) being 0, on the display can be estimated with higher accuracy.

An image color estimation device according to another aspect of the present invention is an image color estimation device that estimates a signal value (XYZ) of an XYZ colorimetric system that indicates a device-independent color of an image displayed on a display from a tone value (R, G, B) of an RGB color specification system inputted to the display and includes a signal value calculation unit that calculates a signal value (Rs, Gs, Bs) of the RGB color specification system based on a first display property and the tone value (R, G, B), an offset value calculation unit that calculates an offset value (Ro, Go, Bo) that corresponds to respective components (Rs, Gs, Bs) in the signal value based on the first display property, a second display property, and the tone value (R, G, B), a signal value correction unit that calculates a correction signal value (Rc, Gc, Bc) of the RGB color specification system by adding the offset value (Ro, Go, Bo) to the signal value (Rs, Gs, Bs), and a signal value conversion unit that converts the correction signal value (Rc, Gc, Bc) into the signal value (Xc, Yc, Zc) using a conversion matrix; the first display property is a relationship between, in a case where at least one component in the tone value (R, G, B) is a variable component, the variable component in the tone value (R, G, B) and a component that corresponds to the variable component in the signal value (Rs, Gs, Bs); and the second display property is a relationship between, in a case where two invariable components in the tone value (R, G, B) are set to fixed values and a remaining variable component is varied, the variable component in the tone value (R, G, B) and a component that corresponds to the invariable component in the signal value (Rs, Gs, Bs).

According to this image color estimation device, each component in the image color is expressed as a sum of the output image signal value (Rs, Gs, Bs) and the offset value (Ro, Go, Bo). In a display in which additive color mixture is not realized and color tracking occurs, the output image signal value (Rs, Gs, Bs) in a case where the respective components of RGB are lit at the same time differs from a value obtained by synthesizing the output image signal value (Rs, Gs, Bs) in a case where the respective components of RGB are lit independently from one another. With this image color estimation device, the offset value is calculated based on the first display property, the second display property, and the tone value (R, G, B). Then, the output image signal value (Rs, Gs, Bs) can be corrected using this offset value. Accordingly, even with a display in which additive color mixture is not realized and color tracking occurs, an image color to be displayed on the display can be estimated with high accuracy based on the tone value (R, G, B) to be inputted to the display.

An image color estimation program according to another aspect of the present invention is an image color estimation program for estimating a signal value (XYZ) of an XYZ colorimetric system that indicates a device-independent color of an image displayed on a display from a tone value (R, G, B) of an RGB color specification system inputted to the display and causes a computer to function as a signal value calculation unit that calculates a signal value (Rs, Gs, Bs) of the RGB color specification system based on a first display property and the tone value (R, G, B), an offset value calculation unit that calculates an offset value (Ro, Go, Bo) that corresponds to respective components (Rs, Gs, Bs) in the signal value based on the first display property, a second display property, and the tone value (R, G, B), a signal value correction unit that calculates a correction signal value (Rc, Gc, Bc) of the RGB color specification system by adding the offset value (Ro, Go, Bo) to the signal value (Rs, Gs, Bs), and a signal value conversion unit that converts the correction signal value (Rc, Gc, Bc) into the signal value (Xc, Yc, Zc) using a conversion matrix; the first display property is a relationship between, in a case where at least one component in the tone value (R, G, B) is a variable component, the variable component in the tone value (R, G, B) and a component that corresponds to the variable component in the signal value (Rs, Gs, Bs); and the second display property is a relationship between, in a case where two invariable components in the tone value (R, G, B)

are set to fixed values and a remaining variable component is varied, the variable component in the tone value (R, G, B) and a component that corresponds to the invariable component in the signal value (Rs, Gs, Bs).

According to this image color estimation program, each component in the image color is expressed as a sum of the output image signal value (Rs, Gs, Bs) and the offset value (Ro, Go, Bo). In a display in which additive color mixture is not realized and color tracking occurs, the output image signal value (Rs, Gs, Bs) in a case where the respective components of RGB are lit at the same time differs from a value obtained by synthesizing the output image signal value (Rs, Gs, Bs) in a case where the respective components of RGB are lit independently from one another. According to this image color estimation program, the offset value is calculated based on the first display property, the second display property, and the tone value (R, G, B). Then, the output image signal value (Rs, Gs, Bs) can be corrected using this offset value. Accordingly, even with a display in which additive color mixture is not realized and color tracking occurs, an image color to be displayed on the display can be estimated with high accuracy based on the tone value (R, G, B) to be inputted to the display.

Advantageous Effects of Invention

According to the image color estimation method, the image color estimation device, and the image color estimation program according to the present invention, an image color of an image displayed on a display in which additive color mixture is not realized and color tracking occurs can be estimated with high accuracy.

BRIEF DESCRIPTION OF DRAWINGS

FIG. 12 is a table for describing a working example 1.

DESCRIPTION OF EMBODIMENTS

Figure 1:
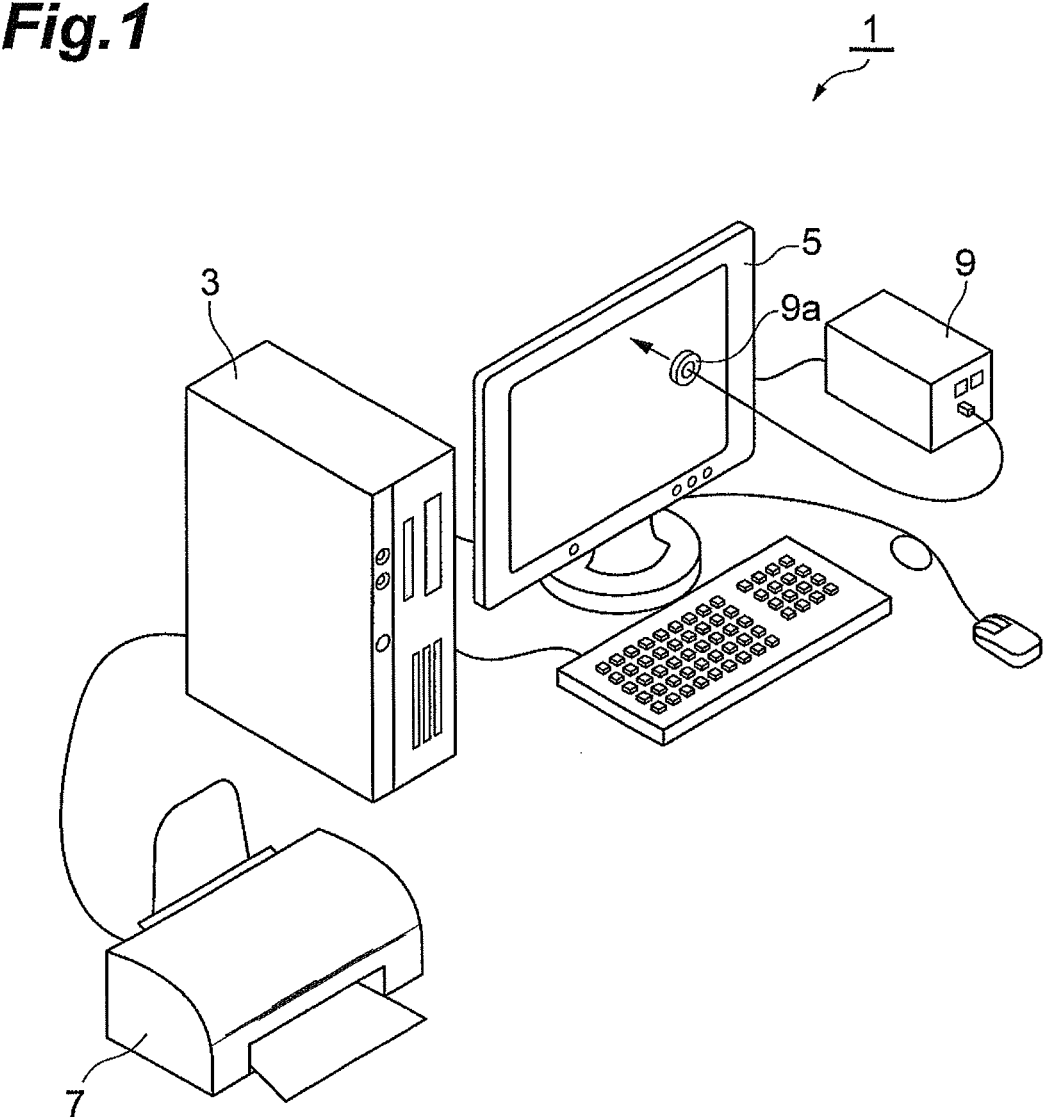
FIG. 1 is a diagram illustrating an embodiment of an image color estimation device for implementing an image color estimation method according to the present invention.

Hereinafter, embodiments of an image color estimation method, an image color estimation device, and an image color estimation program according to the present invention will be described in detail with reference to the appended drawings. Note that identical elements are given identical reference characters in the description of the drawings, and duplicate descriptions thereof will be omitted.

<First Embodiment>

First, a first embodiment will be described. FIG. 1 is a diagram illustrating a configuration of an information processing device (image color estimation device) 1 that executes an image color estimation program for implementing an image color estimation method of the first embodiment. This information processing device 1 includes a personal computer 3 (hereinafter, referred to as "PC"), a display 5, a printer 7, and a colorimeter 9. This information processing device 1 has a function of estimating an image color displayed on the display 5 with high accuracy. Data on an estimated image color is outputted to the printer 7 that is capable of colorimetric printing. Through this, the information processing device 1 can match the image color of the image displayed on the display 5 with the color of a print material printed by the printer 7 with high accuracy.

Figure 2:
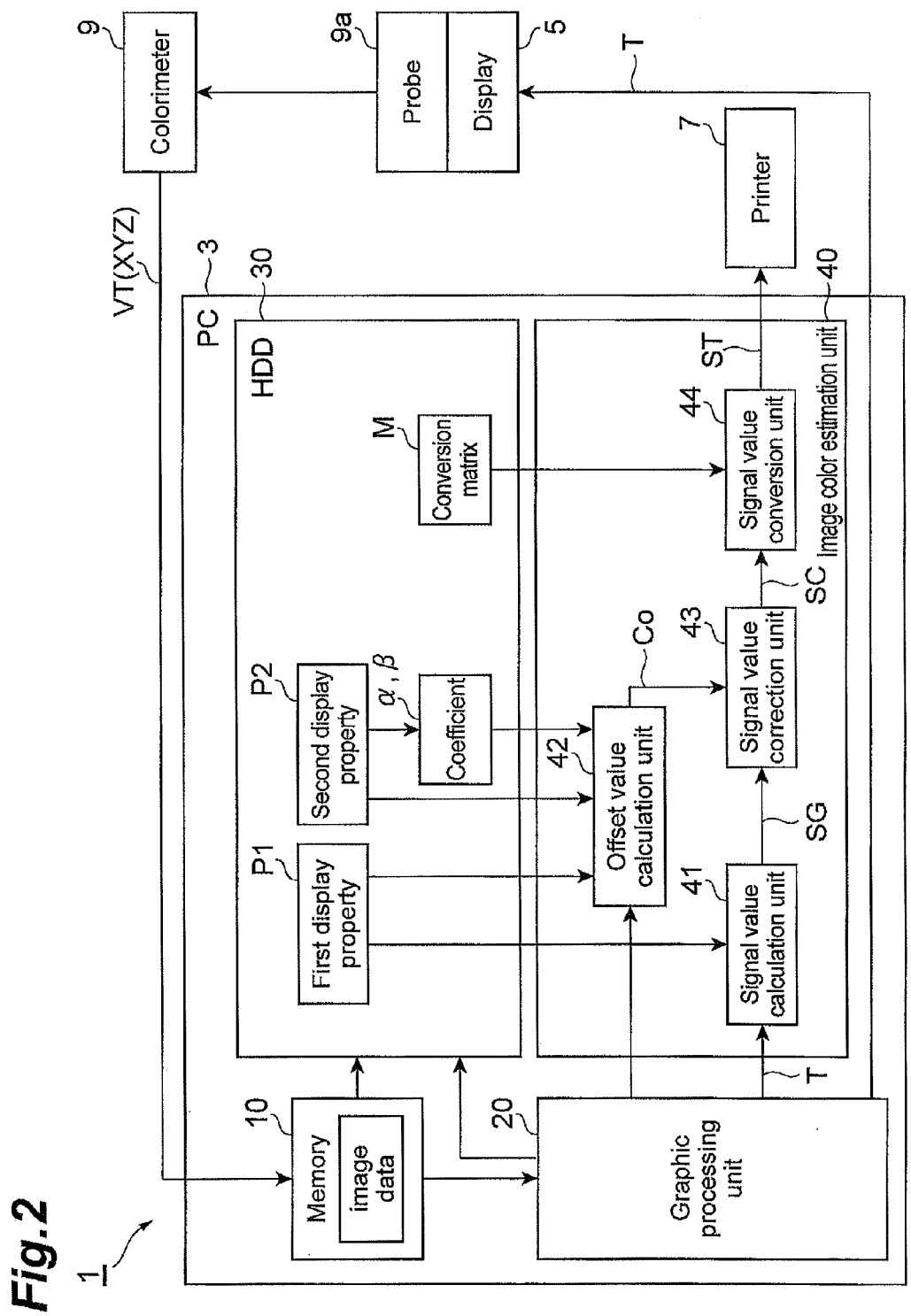
FIG. 2 is a block diagram illustrating a functional configuration of an image processing device for implementing an image color estimation method of a first embodiment.

FIG. 2 is a block diagram illustrating a functional configuration of the information processing device 1. The information processing device 1 implements the image color estimation method of the first embodiment. The PC 3 includes a memory 10 that stores image data, a graphic processing unit 20, a hard disk drive 30 (hereinafter, referred to as "HDD"), and an image color estimation unit 40. The memory 10 has a function of storing image data. Colors in this image data are represented as gradation data of the RGB color specification system. A tone value T of this image data is taken as (R, G, B). R represents a component of red in the tone value T. G represents a component of green in the tone value T. B represents a component of blue in the tone value T.

The graphic processing unit 20 is connected to the memory 10 and the image color estimation unit 40. Further, the graphic processing unit 20 is connected to the display 5. This graphic processing unit 20 edits the image data on the memory 10 in response to an operation of an input device by an operator. Further, the graphic processing unit 20 outputs the aforementioned image data to the display 5 and causes an image to be displayed. Further, the graphic processing unit 20 has a function of outputting the image data on the memory 10 to the printer 7 through the image color estimation unit 40 and causing the image to be printed. Further, the graphic processing unit 20 has a function of outputting reference image data. The reference image data is displayed on the display 5 when acquiring a first display property P1 and a second display property P2, which will be described later. Further, the graphic processing unit 20 has a function of calculating a coefficient α and a coefficient β, which will be described later. Note that this graphic processing unit 20 is a functional constituent element that is partially or entirely realized as software.

The HDD 30 is configured to be capable of being referenced by the image color estimation unit 40. The first display property P1, the second display property P2, the coefficient α, the coefficient β, and a conversion matrix M are stored on this HDD 30. The first display property P1 and the second display property P2 represent a correlation between the tone value T (R, G, B) of the image data and a signal value SG (Rs, Gs, Bs). The tone value T (R, G, B) is the image data to be inputted to the display 5 from the graphic processing unit 20. The signal value SG (Rs, Gs, Bs) is a signal value of an actual image displayed on the display 5 based on the inputted image data. The coefficient α and the coefficient β are coefficients for calculating an approximate curve of the second display property P2. The conversion matrix M is a matrix for converting an RGB value of the RGB color specification system into a tristimulus value (XYZ) of the XYZ colorimetric system.

The image color estimation unit 40 is connected to the HDD 30, the graphic processing unit 20, and the printer 7.

This image color estimation unit 40 includes a signal value calculation unit 41, an offset value calculation unit 42, a signal value correction unit 43, and a signal value conversion unit 44. The image color estimation unit 40 has a function of estimating an image color to be displayed on the display 5. This image color is estimated based on the image data inputted from the graphic processing unit 20 to the display 5. In addition, the image color estimation unit 40 has a function of outputting a signal value (XYZ) that corresponds to the estimated color to the printer 7. Note that this image color estimation unit 40 is a functional constituent element that is partially or entirely realized as software.

The signal value calculation unit 41 is connected to the graphic processing unit 20, the signal value correction unit 43, and the HDD 30. This signal value calculation unit 41 has a function of calculating the signal value SG (Rs, Gs, Bs). This signal value SG (Rs, Gs, Bs) is calculated based on the tone value T (R, G, B), which is image data, and the first display property P1. In addition, the signal value calculation unit 41 has a function of outputting the signal value SG (Rs, Gs, Bs) to the signal value correction unit 43.

The offset value calculation unit 42 is connected to the graphic processing unit 20, the HDD 30, and the signal value correction unit 43. This offset value calculation unit 42 has a function of calculating an offset value Co (Ro, Go, Bo). This offset value Co (Ro, Go, Bo) is calculated based on the tone value T (R, G, B), which is image data, the first display property P1, the second display property P2, the coefficient $\alpha$, and the coefficient $\beta$. In addition, the offset value calculation unit 42 has a function of outputting the offset value Co (Ro, Go, Bo) to the signal value correction unit 43.

The signal value correction unit 43 is connected to the signal value calculation unit 41, the offset value calculation unit 42, and the signal value conversion unit 44. This signal value correction unit 43 has a function of calculating a correction signal value SC (Rc, Gc, Bc). This correction signal value SC (Rc, Gc, Bc) is calculated based on the signal value SG (Rs, Gs, Bs) and the offset value Co (Ro, Go, Bo). In addition, the signal value correction unit 43 has a function of outputting the correction signal value SC (Rc, Gc, Bc) to the signal value conversion unit 44.

The signal value conversion unit 44 is connected to the signal value correction unit 43, the HDD 30, and the printer 7. This signal value conversion unit 44 has a function of converting the correction signal value SC (Rc, Gc, Bc) of the XYZ colorimetric system into a correction signal value ST (Xc, Yc, Zc). The correction signal value SC (Rc, Gc, Bc) is converted into the correction signal value ST (Xc, Yc, Zc) using the conversion matrix M. In addition, the signal value conversion unit 44 has a function of outputting the correction signal value ST (Xc, Yc, Zc) to the printer 7.

The display 5 is connected to the graphic processing unit 20 of the PC 3. This display 5 is a device for displaying image data. The printer 7 is connected to the image color estimation unit 40 of the PC 3. This printer 7 is a device for outputting image data as a print material. The printer 7 has a function of realizing colorimetric color reproduction. The colorimetric color reproduction is such color reproduction that a signal value (Xp, Yp, Zp) of a printed image is identical to a signal value VT (Xs, Ys, Zs) of an image displayed on the display 5. The colorimeter 9 is connected to the PC 3. The colorimeter 9 includes a probe 9a, to be brought into contact with a display screen of the display 5. This colorimeter 9 is a device for acquiring a measurement value (measurement signal value VT) of the XYZ colorimetric system of an image displayed on the screen with the probe 9a, brought into contact with the display 5. As the colorimeter 9, for example, a colorimeter for a light source such as a display colorimeter can be suitably used.

Figure 3:
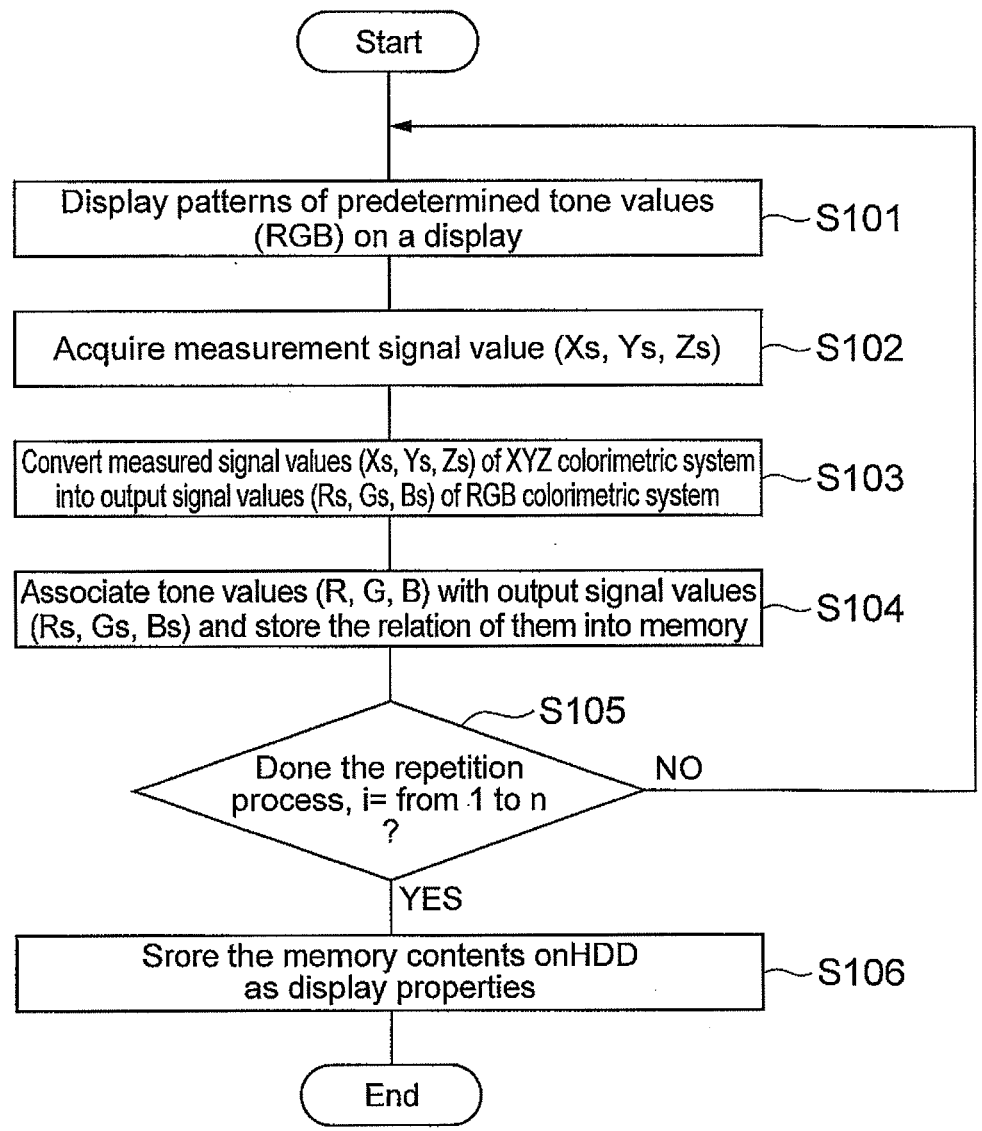
FIG. 3 is a flowchart for describing the image color estimation method of the first embodiment.

Subsequently, with reference to FIGS. 3 to 10, the image color estimation method of the first embodiment will be described. FIG. 3 is a flowchart illustrating processes for acquiring a display property P. The display property P is created through the following process. First, the graphic processing unit 20 generates image data. Then, the graphic processing unit 20 inputs a tone value T1 (R, G, B), which is the generated image data, and causes an image of a single color to be displayed on the display 5 (S101).

This tone value T1 (R, G, B), for example, takes on the tone value T1 (R=255,, G=0,, B=0). A tone value is represented in a numerical range of 0, to 255, (8, bits), but may also be represented in another numerical range of 0, to 1023, (10, bits) or the like. In a state in which this image is displayed, the probe 9a, of the colorimeter 9 is brought into contact with the screen of the display 5 to acquire a measurement signal value VTI (Xs, Ys, Zs) of the image displayed on the screen (S102). This measurement signal value VTI (Xs, Ys, Zs) is inputted to the PC 3 from the colorimeter 9. Note that the probe 9a may be brought into contact with the screen at a plurality of locations to calculate a mean of the measurement signal values VTI (Xs, Ys, Zs). This measurement signal value VTI (Xs, Ys, Zs) is converted into an output image signal value SG1 (Rs, Gs, Bs) using the following Formula (2) (S103).

[Formula 2]

$$\begin{pmatrix} Rs \\ Gs \\ Bs \end{pmatrix} = \begin{pmatrix} X_{R255} & X_{G255} & X_{B255} \\ Y_{R255} & Y_{G255} & Y_{B255} \\ Z_{R255} & Z_{G255} & Z_{B255} \end{pmatrix}^{-1} \begin{pmatrix} Xs \\ Ys \\ Zs \end{pmatrix} \qquad (2)$$

Subsequently, the graphic processing unit 20 associates the tone value T1 (R, G, B) with the output image signal value SG1 (Rs, Gs, Bs) and stores in the memory 10 (S104). Then, the graphic processing unit 20 changes image data to be inputted to the display 5 and then repeats the processes from S101. That is, the graphic processing unit 20 outputs image data of a subsequent tone value T2 (R, G, B) to the display 5 and causes the display 5 to display the image (S101). Then, through the processes described above, a measurement signal value VT2 (Xs, Ys, Zs) is acquired (S102). The acquired measurement signal value VT2 (Xs, Ys, Zs) is converted into an output image signal value SG2 (Rs, Gs, Bs) (S103). Then, the graphic processing unit 20 associates the tone value T2 (R, G, B) with the output image signal value SG2 (Rs, Gs, Bs) and stores in the memory 10 (S104).

The processes described above are repeated for n times, where n is a predetermined number, for the tone value T1 (R, G, B) to a tone value Tn (R, G, B) (S105). By repeating the processes described above, a curve indicating a correlation between a tone value Ti (R, G, B) (i=1, to n) in the display 5 and an output image signal value SGi (Rs, Gs, Bs) can be obtained. Then, the graphic processing unit 20 inputs correlationship of the obtained n combinations to the HDD 20 as the display property P and stores this as a database file (S106).

Here, the display property P will be described in detail. The acquired display property P includes a first display property and a second display property. The first display property is a property that indicates a relationship between a variable component in the tone value T (R, G, B) and a component that corresponds to a variable component of the output image signal value SG (Rs, Gs, Bs). The variable component in the tone value T (R, G, B) is at least one component in the tone value T (R, G, B).

This first display property includes a first display property P1R (see FIG. 4) that indicates a relationship between R in the tone value T (R, G, B) and Rs in the output image signal value SG (Rs, Gs, Bs). R in the tone value T (R, G, B) is a variable component. Further, the first display property includes a first display property P1G (see FIG. 5) that indicates a relationship between G in the tone value T (R, G, B) and Gs in the output image signal value SG (Rs, Gs, Bs). G in the tone value T (R, G, B) is a variable component. In addition, the first display property includes a first display property P1B (see FIG. 6) that indicates a relationship between B in the tone value T (R, G, B) and Bs in the output image signal value SG (Rs, Gs, Bs). B in the tone value T (R, G, B) is a variable component.

Figure 4:
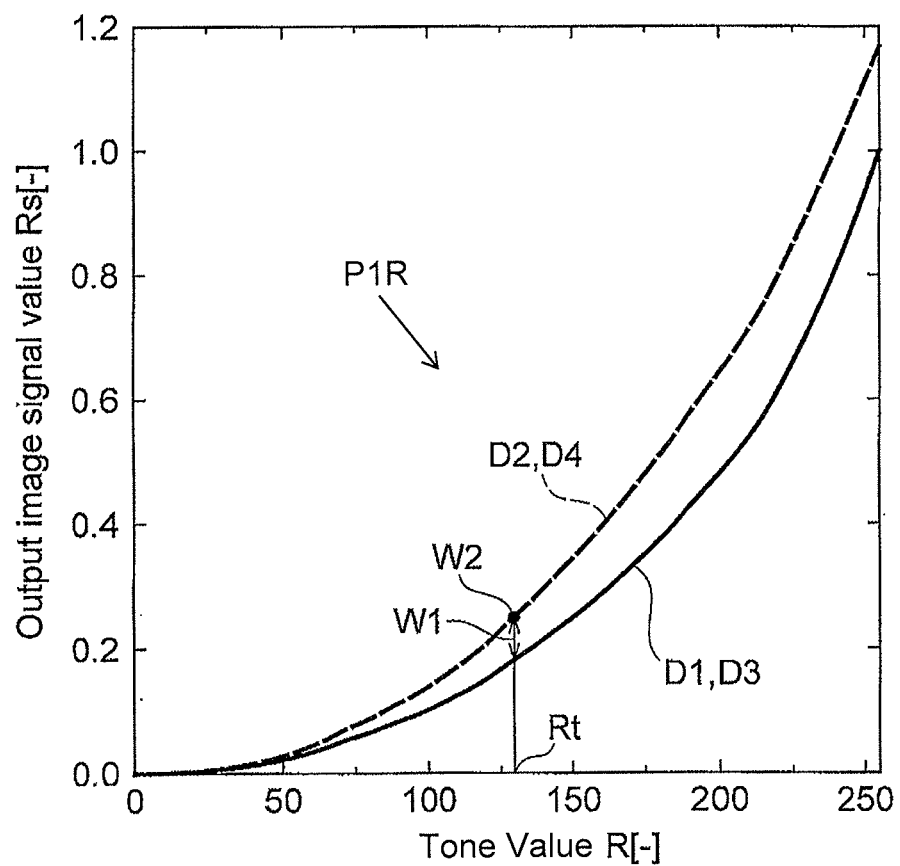
FIG. 4 is a diagram for describing a first display property.

As illustrated in FIG. 4, the first display property P1R indicates a relationship between the component R in the tone value T (R, G, B) and the component Rs in the output image signal value SG (Rs, Gs, Bs).

The tone value T (R, G, B) is a tone value to be inputted to the display 5. The output image signal value SG (Rs, Gs, Bs) is an output image signal value to be displayed on the display 5. This first display property P1R includes properties under four input conditions indicating relationships between the tone value T (R, G, B) and the output image signal value SG (Rs, Gs, Bs). That is, the first display property P1R includes a property in a case where R in the tone value T (R, G, B) is a variable component and G and B are invariable components (see D1 in FIG. 4). R in the tone value T (R, G, B) varies within a range of 0, to 255. Further, the first display property P1R includes a property in a case where R and G in the tone value T (R, G, B) are variable components and B is an invariable component (see D2 in FIG. 4). R and G in the tone value T (R, G, B) vary within a range of 0, to 255. Further, the first display property P1R includes a property in a case where R and B in the tone value T (R, G, B) are variable components and G is an invariable component (see D3 in FIG. 4).

R and B in the tone value T (R, G, B) vary within a range of 0, to 255. In addition, the first display property P1R includes a property in a case where R, G, and B in the tone value T (R, G, B) are variable components (see D4 in FIG. 4). R, G, and B in the tone value T (R, G, B) vary within a range of 0, to 255.

Further, the same value is inputted to all the variable components. For example, the curve D2 in FIG. 4 represents a relationship between R in the tone value T (R, G, B) and Rs in the output image signal value SG (Rs, Gs, Bs). R in the tone value T (R, G, B) is a value of a in a case where image data of the tone value T (R, G, B) where R=a, G=a, B=0, (a=0, to 255) is inputted to the display 5.

Figure 5:
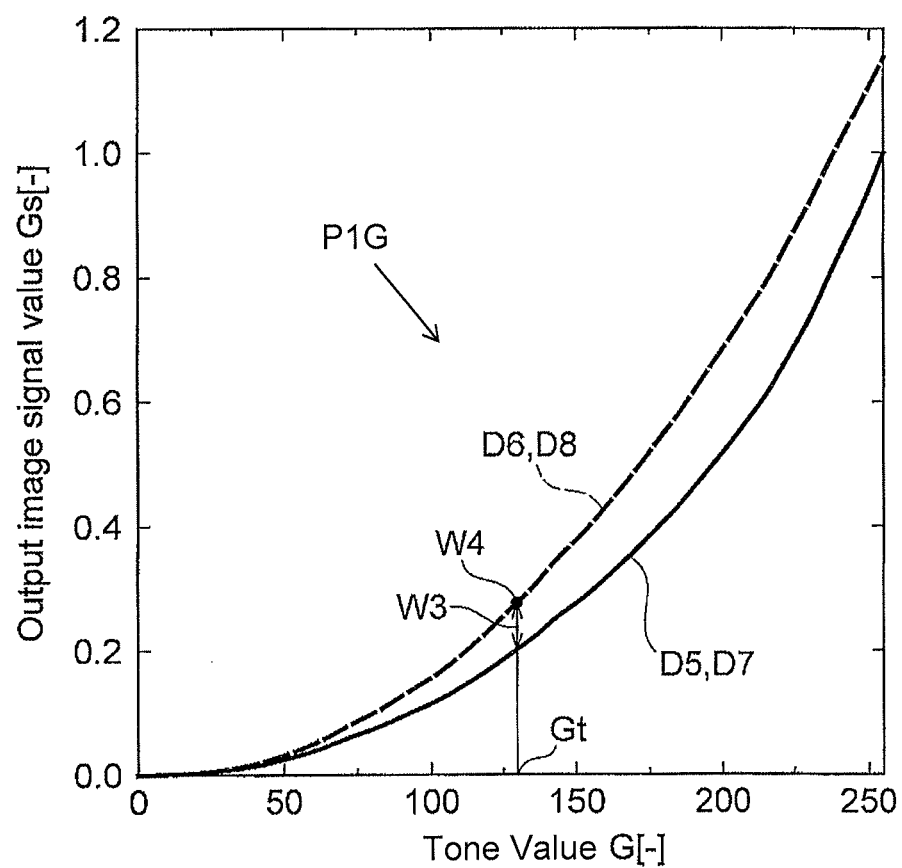
FIG. 5 is a diagram for describing the first display property.

As illustrated in FIG. 5, the first display property P1G indicates a relationship between the component G in the tone value T (R, G, B) and the component Gs in the output image signal value SG (Rs, Gs, Bs). The tone value T (R, G, B) is a tone value to be inputted to the display 5. The output image signal value SG (Rs, Gs, Bs) is an output image signal value to be displayed on the display 5. This first display property P1G includes properties under four input conditions indicating relationships between the tone value T (R, G, B) and the output image signal value SG (Rs, Gs, Bs). That is, the first display property P1G includes a property in a case where G in the tone value T (R, G, B) is a variable component and R and B are invariable components (see D5 in FIG. 5). G in the tone value T (R, G, B) varies within a range of 0, to 255. Further, the first display property P1G includes a property in a case where G and B in the tone value T (R, G, B) are variable components and R is an invariable component (see D6 in FIG. 5). G and B in the tone value T (R, G, B) vary within a range of 0, to 255. Further, the first display property P1G includes a property in a case where R and G in the tone value T (R, G, B) are variable components and B is an invariable component (see D7 in FIG. 5). R and G in the tone value T (R, G, B) vary within a range of 0, to 255. In addition, the first display property P1G includes a property in a case where R, G, and B in the tone value T (R, G, B) are variable components (see D8 in FIG. 5). R, G, and B in the tone value T (R, G, B) vary within a range of 0, to 255.

Further, the same value is inputted to all the variable components. For example, the curve D6 in FIG. 5 represents a relationship between G in the tone value T (R, G, B) and Gs in the output image signal value SG (Rs, Gs, Bs). G in the tone value T (R, G, B) is a value of a in a case where image data of the tone value T (R, G, B) where R=0,, G=a, B=a (a=0, to 255) is inputted to the display 5.

Figure 6:
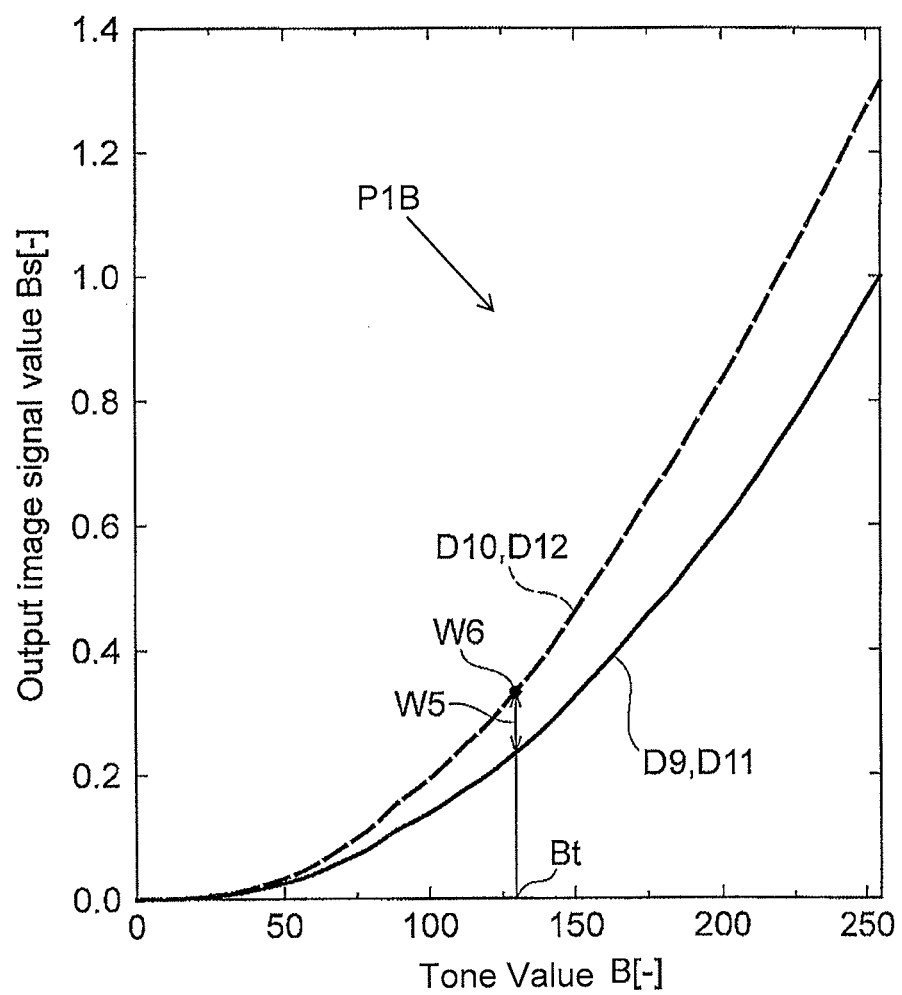
FIG. 6 is a diagram for describing the first display property.

As illustrated in FIG. 6, the first display property P1B indicates a relationship between the component B in the tone value T (R, G, B) and the component Bs in the output image signal value SG (Rs, Gs, Bs). The tone value T (R, G, B) is a tone value to be inputted to the display 5. The output image signal value SG (Rs, Gs, Bs) is an output image signal value to be displayed on the display 5. This first display property P1B includes properties under four input conditions indicating relationships between the tone value T (R, G, B) and the output image signal value SG (Rs, Gs, Bs). That is, the first display property P1B includes a property in a case where B in the tone value T (R, G, B) is a variable component and R and G are invariable components (see D9 in FIG. 6). B in the tone value T (R, G, B) varies within a range of 0, to 255. Further, the first display property P1B includes a property in a case where R and B in the tone value T (R, G, B) are variable components and G is an invariable component (see D10 in FIG. 6). R and B in the tone value T (R, G, B) vary within a range of 0, to 255. Further, the first display property P1B includes a property in a case where G and B in the tone value T (R, G, B) are variable components and R is an invariable component (see D11 in FIG. 6). G and B in the tone value T (R, G, B) vary within a range of 0, to 255. In addition, the first display property P1B includes a property in a case where R, G, and B in the tone value T (R, G, B) are variable components (see D12 in FIG. 6). R, G and B in the tone value T (R, G, B) vary within a range of 0, to 255.

Further, the same value is inputted to all the variable components. For example, the curve D10 in FIG. 6 represents a relationship between B in the tone value T (R, G, B) and Bs in the output image signal value SG (Rs, Gs, Bs). B in the tone value T (R, G, B) is a value of a in a case where image data of the tone value T (R, G, B) where R=a, G=0,, B=a (a=0, to 255) is inputted to the display 5.

Note that although the range for the variable component when acquiring the first display properties P1R, P1G, and P1B is set from 0, to 255,, this range is an example. This range for the variable component is not limited to the range of 0, to 255, as described above, but may be another range. For example, the range for the variable component may be a range of 0, to 1023.

Further, the second display property is a property that indicates a relationship between a variable component in the tone value T (R, G, B) and a component that corresponds to an invariable component in the output image signal value SG (Rs, Gs, Bs). This property is acquired by setting two invariable components in the tone value T (R, G, B) to fixed values and varying the remaining variable component.

This second display property includes, for example, a second display property P2R (see FIG. 7) that indicates a relationship between G in the tone value T (R, G, B) and Rs in the output image signal value SG (Rs, Gs, Bs). G in the tone value T (R, G, B) is a variable component. Further, the second display property includes a second display property P2G (see FIG. 8) that indicates a relationship between B in the tone value T (R, G, B) and Gs in the output image signal value SG (Rs, Gs, Bs). B in the tone value T (R, G, B) is a variable component. In addition, the second display property includes a second display property P2B (see FIG. 9) that indicates a relationship between R in the tone value T (R, G, B) and Bs in the output image signal value SG (Rs, Gs, Bs), etc. R in the tone value T (R, G, B) is a variable component.

Figure 7:
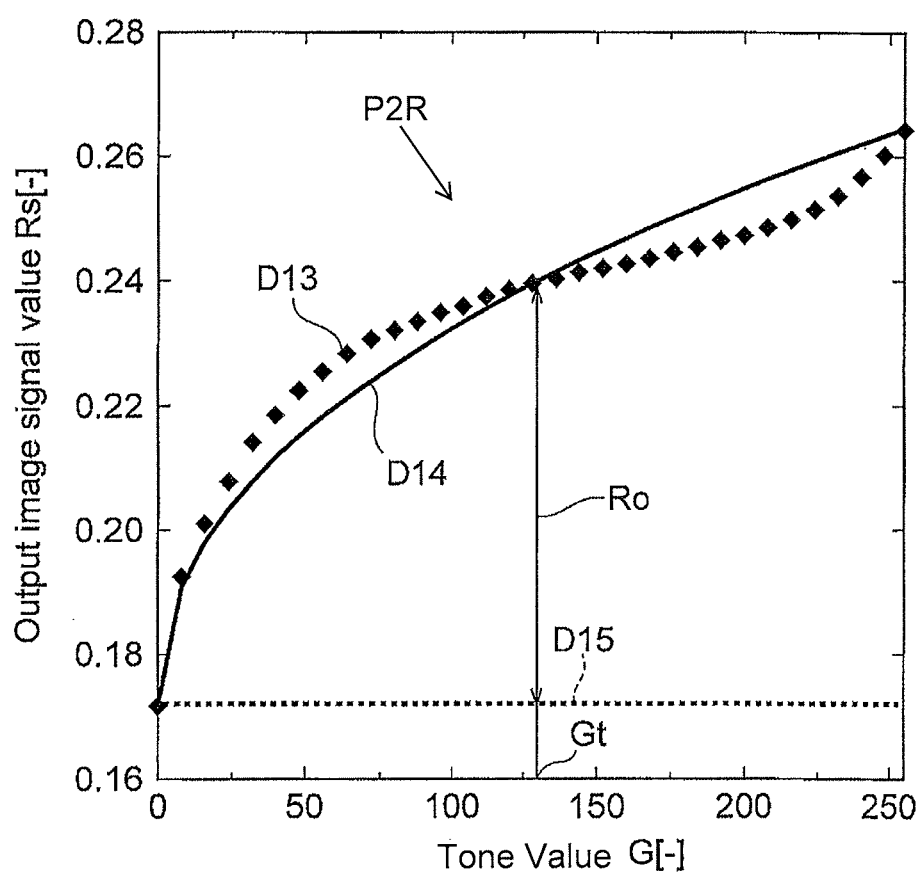
FIG. 7 is a diagram for describing a second display property.

As illustrated in FIG. 7, the second display property P2R indicates a relationship between the component G in the tone value T (R, G, B) and the component Rs in the output image signal value SG (Rs, Gs, Bs) (see D13 in FIG. 7). The component G in the tone value T (R, G, B) is a value of the component G in the tone value T (R, G, B) in a case where R in the tone value T (R, G, B) is fixed to 128,, G is varied from 0, to 255,, and B is fixed to 0. Under the input conditions described above, since R in the tone value T (R, G, B) is fixed to 128,, Rs in the output image signal value SG (Rs, Gs, Bs) is ideally set to be constant (see D15 in FIG. 7). However, in the display 5 in which additive color mixture is not realized and color tracking occurs, even if R in the tone value T (R, G, B) is constant, if the component of G is varied, Rs in the output image signal value SG (Rs, Gs, Bs) varies as indicated by D13 in FIG. 7. A difference between D15 that indicates this ideal property and D13 that indicates an actual property corresponds to the component Ro in the offset value Co (Ro, Go, Bo) of the component Rs in the output image signal value SG (Rs, Gs, Bs).

Figure 8:
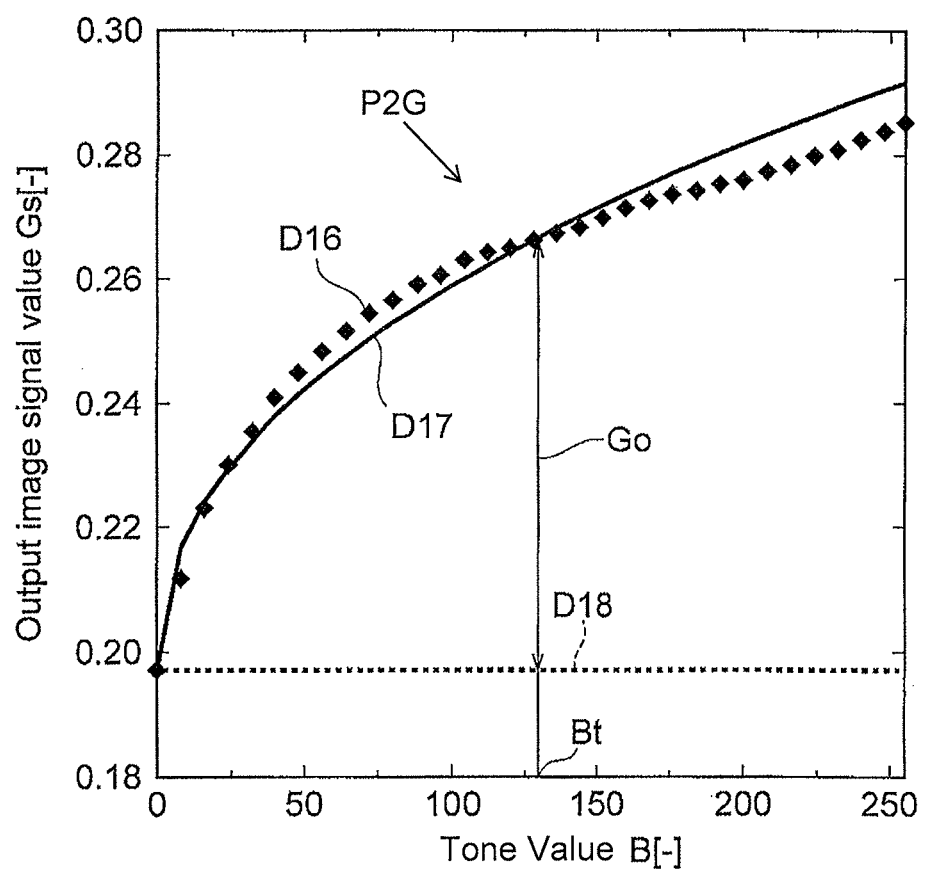
FIG. 8 is a diagram for describing the second display property.

As illustrated in FIG. 8, the second display property P2G indicates a relationship between the component B in the tone value T (R, G, B) and the component Gs in the output image signal value SG (Rs, Gs, Bs) (see D16 in FIG. 8). The component B in the tone value T (R, G, B) is a value of the component B in the tone value T (R, G, B) in a case where R in the tone value T (R, G, B) is fixed to 0,, G is fixed to 128,, and B is varied from 0, to 255. In the display 5 in which additive color mixture is not realized and color tracking occurs, even if G in the tone value T (R, G, B) is constant, if the component of B is varied, Gs in the output image signal value SG (Rs, Gs, Bs) varies as indicated by D16 in FIG. 8. A difference between D18 that indicates the ideal property and D16 that indicates an actual property corresponds to the component Go in the offset value Co (Ro, Go, Bo) of the component Gs in the output image signal value SG (Rs, Gs, Bs).

Figure 9:
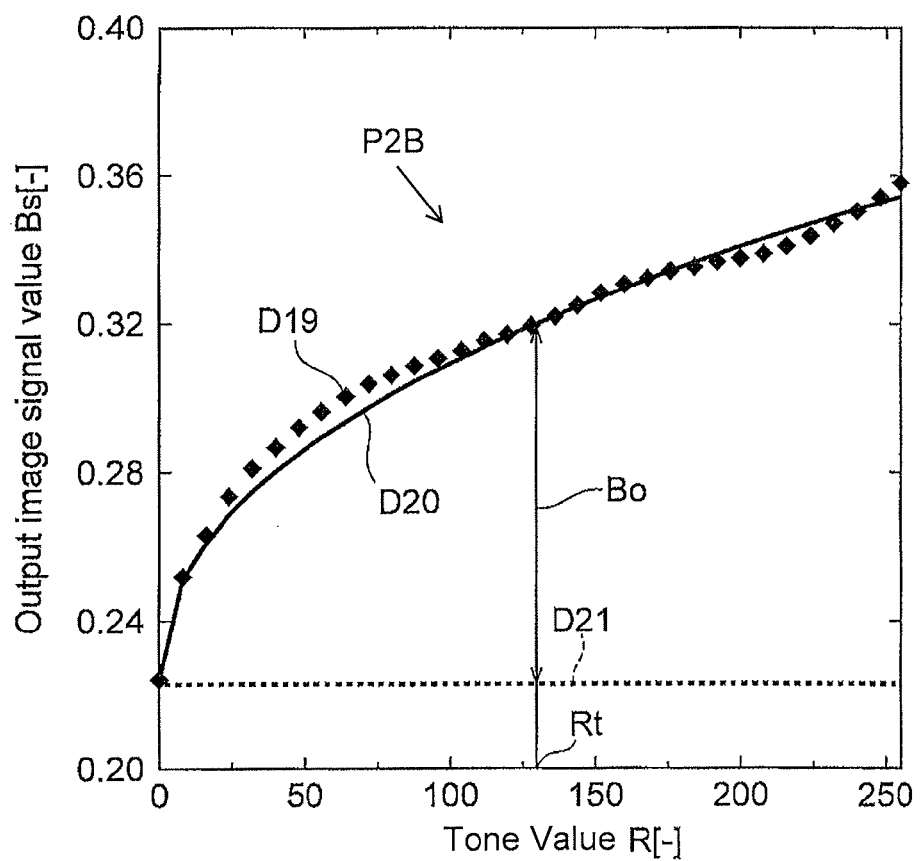
FIG. 9 is a diagram for describing the second display property.

As illustrated in FIG. 9, the second display property P2B indicates a relationship between the component R in the tone value T (R, G, B) and the component Bs in the output image signal value SG (Rs, Gs, Bs) (see D19 in FIG. 9). The component R in the tone value T (R, G, B) is a value of the component R in the tone value T (R, G, B) in a case where R in the tone value T (R, G, B) is varied from 0, to 255,, G is fixed to 0,, and B is fixed to 128. In the display 5 in which additive color mixture is not realized and color tracking occurs, even if B in the tone value T (R, G, B) is constant, if the component of R is varied, Bs in the output image signal value SG (Rs, Gs, Bs) varies as indicated by D19 in FIG. 9. A difference between D21 that indicates the ideal property and D19 that indicates an actual property corresponds to the component Bo in the offset value Co (Ro, Go, Bo) of the component Bs in the output image signal value SG (Rs, Gs, Bs).

Note that the second display properties P2R, P2G, and P2B described above are examples of the second display property P2. Combinations of an invariable component and a variable component selected from the tone value T (R, G, B) may be different combinations from the combinations indicated for the second display properties P2R, P2G, and P2B. Further, although the fixed values in the second display properties P2R, P2G, and P2B described above are 128, and 0,, a fixed value different from 128, and 0, may also be used.

Further, the graphic processing unit 20 calculates the coefficient α and the coefficient β based on the second display property P2 when storing the second display property P2 on the HDD 30. These coefficients α and β are, for example, constants for determining such approximate curves of the second display property P2 as those illustrated in FIGS. 7 to 9.

A coefficient α1 is a constant for setting an approximate curve of a relationship between the component G in the tone value T (R, G, B) and the component Rs in the output image signal value SG (Rs, Gs, Bs) (see D14 in FIG. 7). The coefficient α1 is set such that a difference between the approximate curve (D14) and the actual display property (D13) is reduced. A coefficient α2 is a constant for setting an approximate curve of a relationship between the component B in the tone value T (R, G, B) and the component Gs in the output image signal value SG (Rs, Gs, Bs) (see D17 in FIG. 8). The coefficient α2 is set such that a difference between the approximate curve (D17) and the actual display property (D16) is reduced. A coefficient α3 is a constant for setting an approximate curve of a relationship between the component R in the tone value T (R, G, B) and the component Bs in the output image signal value SG (Rs, Gs, Bs) (see D20 in FIG. 9). The coefficient α3 is set such that a difference between the approximate curve (D20) and the actual display property (D19) is reduced. Further, a coefficient β1 is a constant for setting an approximate curve of a relationship between the component B in the tone value T (R, G, B) and the component Rs in the output image signal value SG (Rs, Gs, Bs). A coefficient β2 is a constant for setting an approximate curve of a relationship between the component R in the tone value T (R, G, B) and the component Gs in the output image signal value SG (Rs, Gs, Bs). A coefficient β3 is a constant for setting an approximate curve of a relationship between the component G in the tone value T (R, G, B) and the component Bs in the output image signal value SG (Rs, Gs, Bs).

Note that the first display property P1, the second display property P2, the coefficient a, and the coefficient β may be acquired by the operator using the image color estimation device 1 immediately after the display 5 is introduced or may be acquired at regular intervals. Further, the above may be acquired each time prior to starting the operation. Further, with the method described above, image data of a single color of the tone values T1 (R, G, B) to Tn (R, G, B) are sequentially displayed piece by a piece on the display 5. As another method, for example, a color chart in which image data of the tone values T1 (R, G, B) to Tn (R, G, B) are combined may be displayed on a single screen, and the measurement signal value VT (Xs, Ys, Zs) may be measured for each color chart to acquire the display property P. In addition, the first display property P1 and the second display property P2 may be represented in a measurement value acquired through input values of 0, to 255. Further, the first display property P1 and the second display property P2 may be represented in an approximation function that is generated based on a measurement value acquired by inputting only a predetermined condition among the input values of 0, to 255.

Figure 10:
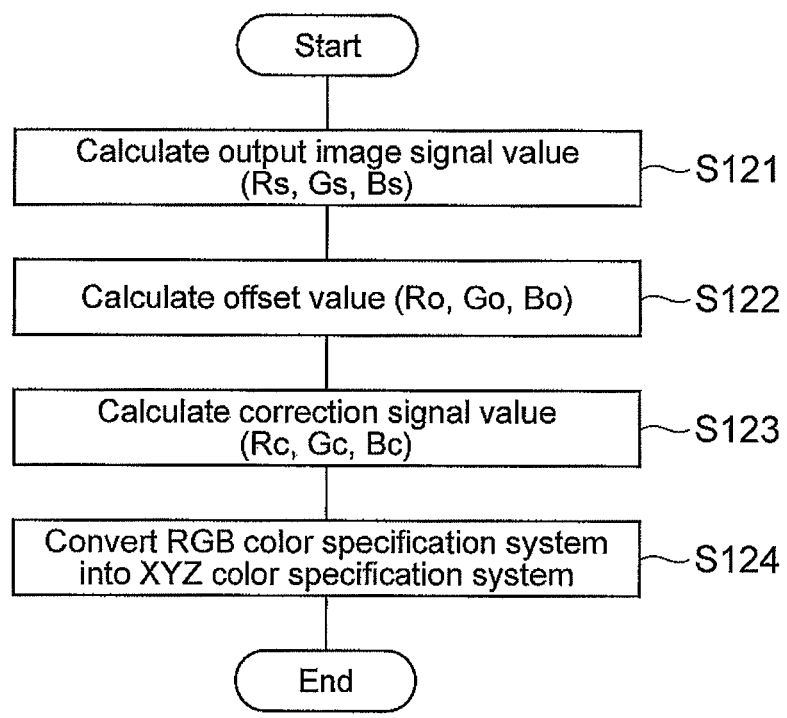
FIG. 10 is a flowchart for describing the image color estimation method of the first embodiment.

Subsequently, a method for estimating an image color in a case where image data stored on the memory 10 is displayed on the display 5 will be described. Here, the tone value T (R, G, B) of the image data to be inputted to the display 5 is set to be (Rt, Gt, Bt). FIG. 10 is a flowchart illustrating the processes in an image color estimation method.

<First Calculation Step>

First, the output image signal value SG (Rs, Gs, Bs) is calculated (S121). The output image signal value SG (Rs, Gs, Bs) corresponds to the tone value T (Rt, Gt, Bt). This process is carried out by the signal value calculation unit 41 (see FIG. 2). First, Rs that corresponds to Rt is calculated. Here, Rs is a component in the output image signal value SG in a case where only red is lit at a value of Rt. The curve D1 that represents the first display property P1R pertaining to red is referred to. Then, Rs that is associated with the value of Rt is searched for on the curve D1.

Next, Gs that corresponds to Gt is calculated. Here, Gs is a component in the output image signal value SG in a case where only green is lit at a value of Gt. The curve D5 that represents the first display property P1G pertaining to green is referred to. Then, Gs that is associated with the value of Gt is searched for on the curve D5.

Next, Bs that corresponds to Bt is calculated. Here, Bs is a component in the output image signal value SG in a case where only blue is lit at a value of Bt. The curve D7 that represents the first display property P1B pertaining to blue is referred to. Then, Bs that is associated with the value of Bt is searched for on the curve D9.

<Second Calculation Step>

Subsequently, the offset value calculation unit 42 calculates the offset value Co (Ro, Go, Bo) based on the tone value T (Rt, Gt, Bt) (S122). This process is carried out by the offset value calculation unit 42 (see FIG. 2). This offset value Co (Ro, Go, Bo) is calculated by the following Formula (3). Here, $\Delta Cs$ and $\Delta C's$ are functions of the tone value T (Rt, Gt, Bt). C1, C2,, and C3, are components in the tone value T that are selected from the tone value T (Rt, Gt, Bt). That is, the offset value Co (Ro, Go, Bo) is calculated as a value that is represented by a function of the tone value T (Rt, Gt, Bt).

[Formula 3]

$$Co = \Delta Cs \cdot \left(\frac{C2}{C1}\right)^{\alpha} + \Delta C's \cdot \left(\frac{C3}{C1}\right)^{\beta} \quad (3)$$

To be more specific, when calculating the offset value Co (Ro, Go, Bo), the above Formula (3) is expressed as in the following Formula (4). Further, $\Delta Rs$ and $\Delta R's$ in Formula (4) are expressed by the following Formula (5). $\Delta Rs$ in the following Formula (5) is a value in a case where R is a first component that is an invariable component and G is a second component that is a variable component. Further, $\Delta R's$ in the following Formula (5) is a numerical value in a case where R is the first component that is an invariable component and B is a third component that is a variable component.

[Formula 4]

$$Ro(Rt, Gt, Bt) = \Delta Rs(Rt) \cdot \left(\frac{Gt}{Rt}\right)^{\alpha 1} + \Delta R's(Rt) \cdot \left(\frac{Bt}{Rt}\right)^{\beta 1} \quad (4)$$

[Formula 5]

$$\Delta Rs(Rt) = Rs.rg0(Rt) - Rs.r00(Rt) \quad (5)$$
$$\Delta R's(Rt) = Rs.rgb(Rt) - Rs.rg0(Rt)$$

Rs.rg0(Rt) in the above Formula (5) is the component Rs in the output image signal value SG of an image to be displayed when the image data is inputted to the display 5. In this image data, R and G are values of Rt and B is 0. Here, the curve D2 (see FIG. 4) that represents a display property where, of the display property P pertaining to red, R and G are variable components is referred to. Then, Rs.rg0(Rt) that is associated with the value of Rt is searched for on the curve D2.

Further, Rs.r00(Rt) is a component in the output image signal value SG of an image to be displayed when the image data is inputted to the display 5. In this image data, R is a value of Rt. Here, the curve D1 (see FIG. 4) that represents a display property where, of the display property P pertaining to red, R is a variable component is referred to. Then, Rs.r00(Rt) that is associated with the value of Rt is searched for on the curve D1. Then, $\Delta Rs(Rt)$ is calculated by subtracting Rs.r00(Rt) from Rs.rg0(Rt). As described above, in the display 5 in which additive color mixture is not realized and color tracking occurs, even if the component R in the tone value T (R, G, B) is constant, the component Rs in the output image signal value SG (Rs, Gs, Bs) varies as the component G of another color is lit. That is, $\Delta Rs(Rt)$ represents a deviation in the signal value Rs of a red component that is generated as the red component and a green component are lit at the same time and at the same value of Rt (see W1 in FIG. 4).

Rs.rgb(Rt) in the above Formula (5) is a component in the output image signal value SG of an image to be displayed when the image data is inputted to the display 5. In this image data, R, G, and B are values of Rt. The curve D4 (see FIG. 4) that represents a display property where, of the display property P pertaining to red, R, G, and B are variable components is referred to. Then, Rs.rgb (Rt) that is associated with the value of Rt is searched for on the curve D4.

Subsequently, Rs.rg0, (Rt) is obtained through a process similar to the process described above. Then, $\Delta R$'s (Rt) is calculated by subtracting Rs.rg0, (Rt) from Rs.rgb (Rt). AR's (Rt) represents a deviation in the signal value Rs of a red component that is generated as the red component and a blue component are lit at the same time and at the same value of Rt. However, as illustrated in FIG. 4, even if the red component and the blue component are lit at the same time, the deviation in the signal value Rs of the red component does not occur (see W2 in FIG. 4). Accordingly, $\Delta R$'s is 0. Then, the coefficient al is referred to. Through this, Ro is calculated after all the variables in the above Formula (4) are determined.

Subsequently, Go is calculated. When calculating Go, the above Formula (3) is expressed as in the following Formula (6). Further, $\Delta Gs$ and $\Delta G's$ are expressed by the following Formula (7). $\Delta Gs$ in the following Formula (7) is a value in a case where G is a first component that is an invariable component and B is a second component that is a variable component. Further, $\Delta G's$ in the following Formula (5) is a numerical value in a case where G is the first component that is an invariable component and R is a third component that is a variable component.

[Formula 6]

$$Go(Rt, Gt, Bt) = \Delta Gs(Gt) \cdot \left(\frac{Bt}{Gt}\right)^{\alpha 2} + \Delta G's(Gt) \cdot \left(\frac{Rt}{Gt}\right)^{\beta 2} \quad (6)$$

[Formula 7]

$$\Delta Gs(Gt) = Gs.0gb(Gt) - Gs.0g0(Gt) \quad (7)$$
$$\Delta G's(Gt) = Gs.rgb(Gt) - Gs.0gb(Gt)$$

Gs.0gb (Gt) in the above Formula (7) is the component Gs in the output image signal value SG of an image to be displayed when the image data is inputted to the display 5. In this image data, G and B are values of Gt and R is 0. Here, the curve D6 that represents a display property where, of the display property P pertaining to green (see FIG. 5), G and B are variable components is referred to.

Then, Gs.0gb (Gt) that is associated with the value of Gt is searched for on the curve D6. Then, Gs.0g0, (Gt) is a component in the output image signal value SG of an image to be displayed when the image data is inputted to the display 5. In this image data, G is a value of Gt and R and B are 0. The curve D5 that represents a display property where, of the display property P pertaining to green (see FIG. 5), G is a variable component is referred to. Then, Gs.0g0, (Gt) that is associated with the value of Gt is searched for on the curve D5. Then, ΔGs (Gt) is calculated by subtracting Gs.0g0, (Gt) from Gs.0gb (Gt). As described above, in the display 5 in which additive color mixture is not realized and color tracking occurs, even if the component G in the tone value T (R, G, B) is constant, the component Gs in the output image signal value SG (Rs, Gs, Bs) varies as the component B of another color is lit. That is, ΔGs(Gt) represents a deviation in the green component Gs that is generated as the green component and a blue component are lit at the same time and at the same value of Gt (see W3 in FIG. 5).

Gs.rgb (Gt) in the above Formula (7) is a component in the output image signal value SG of an image to be displayed when the image data is inputted to the display 5. In this image data, R, G, and B are values of Gt. The curve D8 that represents a display property where, of the display property P pertaining to green (see FIG. 5), R, G, and B are variable components is referred to. Then, Gs.rgb (Gt) that is associated with the value of Gt is searched for on the curve D8.

Subsequently, Gs.0gb (Gt) is obtained through a process similar to the process described above. Then, ΔG's (Gt) is calculated by subtracting Gs.0gb (Gt) from Gs.rgb(Gt). ΔG's (Gt) represents a deviation in the green component Gs that is generated as the green component and a red component are lit at the same time and at the same value of Gt. However, as illustrated in FIG. 5, even if the green component and the red component are lit at the same time, the deviation in the green component Gs does not occur (see W4 in FIG. 5). Accordingly, ΔG's is 0. Then, the coefficient α2 is referred to. Through this, Go is calculated since all the variables in the above Formula (6) are determined.

Subsequently, Bo is calculated. When calculating Bo, the above Formula (3) is expressed as in the following Formula (8). ΔBs and ΔB's are expressed by the following Formula (9). ΔBs in the following Formula (9) is a value in a case where B is a first component that is an invariable component and R is a second component that is a variable component. Further, ΔB's in the following Formula (5) is a numerical value in a case where B is the first component that is an invariable component and G is a third component that is a variable component.

[Formula 8]

$$Bo(Rt, Gt, Bt) = \Delta Bs(Bt) \cdot \left(\frac{Rt}{Bt}\right)^{\alpha 3} + \Delta B's(Bt) \cdot \left(\frac{Gt}{Bt}\right)^{\beta 3} \quad (8)$$

[Formula 9]

$$\Delta Bs(Bt) = Bs.r0b(Bt) - Bs.00b(Bt) \quad (9)$$
$$\Delta B's(Bt) = Bs.rgb(Bt) - Bs.r0b(Bt)$$

Bs.r0b (Bt) in the above Formula (9) is the component Bs in the output image signal value SG of an image to be displayed when the image data is inputted to the display 5. In this image data, R and B are values of Bt and G is 0. Here, the curve D10 that represents a display property where, of the display property P pertaining to blue (see FIG. 6), R and B are variable components is referred to.

Then, Bs.r0b (Bt) that is associated with the value of Bt is searched for on the curve D10. Then, Bs.00b (Bt) is a component in the output image signal value SG of an image to be displayed when the image data is inputted to the display 5. In this image data, B is at a value of Bt and R and G are 0. The curve D9 that represents a display property where, of the display property P pertaining to blue (see FIG. 6), B is a variable component is referred to. Then, Bs.00b (Bt) that is associated with the value of Bt is searched for on the curve D9. Then, ΔBs (Bt) is calculated by subtracting Bs.00b (Bt) from Bs.r0b (Bt). As described above, in the display 5 in which additive color mixture is not realized and color tracking occurs, even if the component B in the tone value T (R, G, B) is constant, the component Bs in the output image signal value SG (Rs, Gs, Bs) varies as the component R of another color is lit. That is, ΔBs(Bt) represents a deviation in the signal value Bs of a blue component that is generated as the blue component and a red component are lit at the same time and at the same value of the component Bt (see W5 in FIG. 6).

Bs.rgb (Bt) in the above Formula (9) is a component in the output image signal value SG of an image to be displayed when the image data is inputted to the display 5. In this image data, R, G and B are values of Bt. The curve D12 that represents a display property where, of the second display property P2B pertaining to blue (see FIG. 6), R, G, and B are variable components is referred to.

Then, Bs.rgb (Bt) that is associated with the value of Bt is searched for on the curve D12. Bs.r0b (Bt) is obtained by a process similar to the process described above. Then, ΔB's (Bt) is calculated by subtracting Gs.r0b (Bt) from Bs.rgb (Bt). ΔB's (Bt) represents a deviation in the blue component Bs that is generated as the blue component and a green component are lit at the same time and at the same value. However, as illustrated in FIG. 6, even if the blue component and the green component are lit at the same time, the deviation in the blue component Bs does not occur (see W6 in FIG. 6). Accordingly, ΔB's is 0. Then, the coefficient α3 is referred to. Through this, Bo is calculated since all the variables in the above Formula (8) are determined.

Note that although the offset value Co (Ro, Go, Bo) is calculated based on Formula (1) in step S122, the present invention is not limited to this method. For example, the measurement values D13, D16, and D19 illustrated in FIGS. 7 to 9 may be approximated by a regression curve, and then the offset value Co (Ro, Go, Bo) may be calculated from the regression curve. An approximation formula in this case differs from the above Formula (1). According to such a method, an image color to be displayed on the display 5 can be estimated with higher accuracy. For example, a color difference in the image color that is estimated using the regression curve is approximately ¼, to ⅕, of a color difference in the image color that is estimated using Formula (1).

<Third Calculation Step>

Subsequently, the signal value correction unit 43 calculates a correction value of an output image signal (correction signal value SC (Rc, Gc, Bc)) (S123). The correction signal value SC (Rc, Gc, Bc) is calculated based on the output image signal value SG (Rs, Gs, Bs) that has been calculated in the first calculation step and the offset value Co (Ro, Go, Bo) that has been calculated in the second calculation step. This process is carried out by the signal value correction unit 43 (see FIG. 2). The correction signal value SC (Rc, Gc, Bc) is calculated by the following Formula (10).

[Formula 10]

$$Rc = Rs + Ro$$

$$Gc = Gs + Go$$

$$Bc = Bs + Bo \qquad (10)$$

Here, Rs, Gs, and Bs correspond to the respective components in the output image signal value SG (Rs, Gs, Bs) which have been calculated by the signal value calculation unit 41. Further, Ro, Go, and Bo correspond to the respective components in the offset value Co (Ro, Go, Bo) which have been calculated by the offset value calculation unit 42. The correction signal value SC (Rc, Gc, Bc) is calculated by adding the respective components in the output image signal value SG to the respective components in the offset value Co.

<Fourth Calculation Step>

Subsequently, the correction signal value SC (Rc, Gc, Bc) is converted into a correction signal value ST (Xc, Yc, Zc) (S124). The correction signal value ST (Xc, Yc, Zc) is a signal value of the XYZ colorimetric system that represents device-independent colors. This process is carried out by the signal value conversion unit 44 (see FIG. 2). The following Formula (11) is used for the conversion. Here, M is a conversion matrix and is expressed by the following Formula (12). Elements in this matrix are tristimulus values (XYZ) where all the components in the tone value T (R, G, B) are at the maximum luminance (R=255, G=255, B=255). By the procedures described above, an image color in a case where the image data stored on the memory 10 is displayed on the display 5 is estimated.

[Formula 11]

$$\begin{pmatrix} Xc \\ Yc \\ Zc \end{pmatrix} = (M) \begin{pmatrix} Rc \\ Gc \\ Bc \end{pmatrix} \qquad (11)$$

[Formula 12]

$$(M) = \begin{pmatrix} X_{R255} & X_{G255} & X_{B255} \\ Y_{R255} & Y_{G255} & Y_{B255} \\ Z_{R255} & Z_{G255} & Z_{B255} \end{pmatrix} \qquad (12)$$

In the image color estimation method of the first embodiment as described above, the following processes are carried out by the image color estimation unit 40. First, the output image signal value SG (Rs, Gs, Bs) of the RGB color specification system is calculated by the signal value calculation unit 41 based on the first display property P1 and the tone value T (R, G, B). Then, the offset value Co (Ro, Go, Bo) that corresponds to the respective components (Rs, Gs, Bs) in the output image signal value SG is calculated by the offset value calculation unit 42 based on the first display property P1, the second display property P2, and the tone value T (R, G, B). Subsequently, the correction signal value SC (Rc, Gc, Bc) of the RGB color specification system is calculated by the signal value correction unit 43 by adding the offset value Co (Ro, Go, Bo) to the output image signal value SG (Rs, Gs, Bs). Thereafter, the correction signal value SC (Rc, Gc, Bc) is converted into the correction signal value ST (Xc, Yc, Zc) of the XYZ colorimetric system by the signal value conversion unit 44 using the conversion matrix M. In the first embodiment, each component in the image color is expressed as a sum of the output image signal value SG (Rs, Gs, Bs) and the offset value Co (Ro, Go, Bo).

In the image color estimation method according to the first embodiment, each component in the image color is expressed as a sum of the output image signal value SG (Rs, Gs, Bs) and the offset value Co (Ro, Go, Bo). In a display in which additive color mixture is not realized and color tracking occurs, the output image signal value SG (Rs, Gs, Bs) in a case where the respective components of RGB are lit at the same time differs from a value obtained by lighting the respective components of RGB independently from one another and synthesizing the output image signal value SG (Rs, Gs, Bs). With the image color estimation device of the first embodiment, this amount of the difference can be calculated as the offset value Co based on the first display property, the second display property, and the tone value T (R, G, B), and the output image signal value SG (Rs, Gs, Bs) can be corrected using that offset value Co. Accordingly, even with a display in which additive color mixture is not realized and color tracking occurs, an image color to be displayed on the display can be estimated with high accuracy based on the tone value T (R, G, B) to be inputted to the display.

Further, in the image color estimation method according to the first embodiment, a difference between a component that corresponds to a first component in the output image signal value SG (Rs, Gs, Bs) in a case where only the first component is lit and a component that corresponds to a first component in the output image signal value SG (Rs, Gs, Bs) in a case where the first component and a second component are lit can be calculated by a first term in the above Formula (1). In addition, a difference between a component that corresponds to a first component in the output image signal value SG (Rs, Gs, Bs) in a case where only the first component is lit and a component that corresponds to a first component in the output image signal value SG (Rs, Gs, Bs) in a case where the first component and a third component are lit can be calculated by a second term in the above Formula (1). Accordingly, even with a display in which additive color mixture is not realized and color tracking occurs, an image color to be displayed on the display can be estimated with high accuracy based on the tone value T (R, G, B) to be inputted to the display.

Further, in the image color estimation method according to the first embodiment, desired estimation accuracy can be obtained while reducing a required data amount. The desired estimation accuracy, for example, is a color difference of 1, or less. That is, in the image color estimation method according to the first embodiment, the offset value Co (Ro, Go, Bo) is calculated using an approximation formula (Formula (3) to Formula (9)). This approximation formula is obtained based on the total of nine graphs including, in addition to the six graphs illustrated in FIG. 4 to FIG. 9, three graphs that are obtained from the data where all the components of RGB are lit on the display 5 at the same gradation. That is, this approximation formula is obtained based on a first value, a second value, and a third value. Here, the first value is a value of a display color for a combination of three types of tone values when two of the RGB signals have the same and constant tone value (this may be 0) and one of the RGB signals has a tone value that varies from 0, to the maximum value. The second value is a value of a display color for a combination of three types of tone values when one of the RGB signals has a constant tone value (this may be 0) and two of the RGB signals each have a tone value that varies from 0, to the maximum value. The third value is a value of a display color when three of the RGB signals have the same tone value that varies from 0, to the maximum value.

<Second Embodiment>

Subsequently, a second embodiment will be described. The second embodiment differs from the first embodiment described above in that the correction signal value SC (Rc, Gc, Bc) is converted into the correction signal value ST (Xc, Yc, Zc) of the XYZ colorimetric system in the fourth step and a zero-bias value is corrected.

Figure 11:
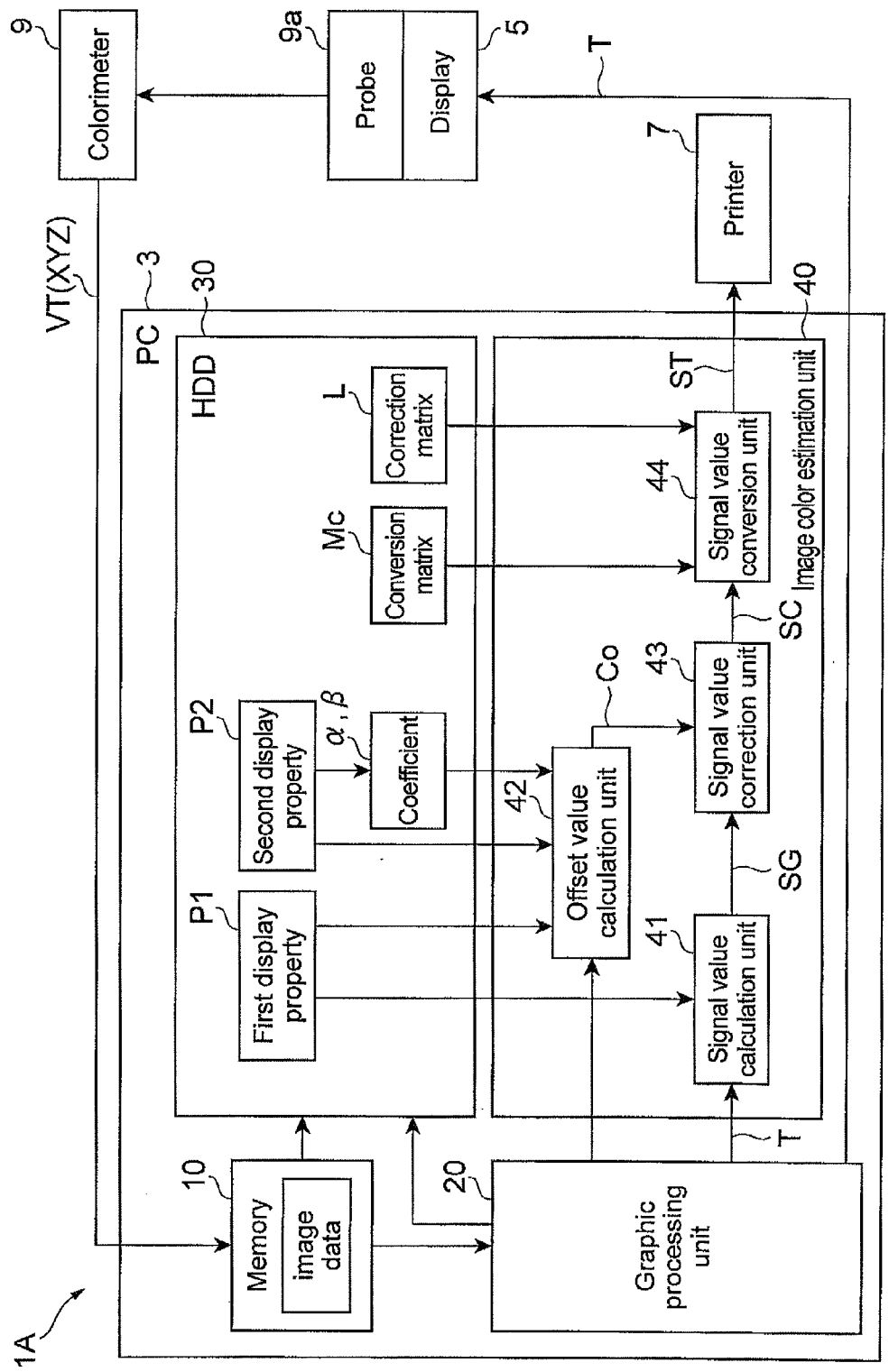
FIG. 11 is a block diagram illustrating a functional configuration of an image processing device for implementing an image color estimation method of a second embodiment.

With an image display device such as a liquid crystal display, in a case where the tone value T (R, G, B) where the components of the respective colors are all 0, is inputted and the image color on the screen is measured, each component in the output image signal value SG (Rs, Gs, Bs) does not turn out to be 0. That is, if the image color on the screen is measured, a predetermined measurement signal value VT (Xk, Yk, Zk) is obtained. This will be referred to as a zero-bias value. FIG. 11 illustrates an example of a configuration of an information processing device 1A to be used in an image color estimation method according to the second embodiment. The information processing device 1 A illustrated in FIG. 11 includes the configuration of the information processing device 1 of the first embodiment illustrated in FIG. 2 and additionally stores a correction matrix L on the HDD 20 for correcting the zero-bias value.

Subsequently, the image color estimation method according to the second embodiment will be described. In the image color estimation method according to the second embodiment, processes from the first calculation step (S121) to the third calculation step (S123) illustrated in FIG. 10 are the same as those in the image processing method according to the first embodiment described above. First, the correction matrix L is generated. The graphic processing unit 20 outputs image data to the display 5. In this image data, the respective components in the tone value T (R, G, B) are all 0. Next, the probe 9a of the colorimeter 9 is brought into contact with the screen of the display 5 to acquire the measurement signal value VT (Xk, Yk, Zk). This measurement value is inputted to the PC 3 from the colorimeter 9. The respective components in this tristimulus value correspond to the respective components in the correction matrix L. That is, in the case of the measurement signal value VT (Xk, Yk, Zk), the correction matrix L is as in the following Formula (13).

[Formula 13]

$$(L) = \begin{pmatrix} Xk \\ Yk \\ Zk \end{pmatrix} \quad (13)$$

<Fourth Calculation Step>

Subsequently, along with the process to convert the correction signal value SC (Rc, Gc, Bc) into an XYZ value, the zero-bias value is corrected. This process is carried out by the signal value conversion unit 44 (see FIG. 11). The following Formula (14) is used for the conversion. Here, Mc is a conversion matrix that includes a correction component of the zero-bias value. Mc is expressed by the following Formula (15). Elements in this matrix are obtained by subtracting each component in the correction matrix L from the output image signal value (XYZ). In this output image signal value (XYZ), all the components in the tone value T (R, G, B) are at the maximum luminance (R=255,, G=255,, B=255). Through the procedures described above, an image color in which the zero-bias is corrected is calculated.

[Formula 14]

$$\begin{pmatrix} Xc \\ Yc \\ Zc \end{pmatrix} = (Mc) \begin{pmatrix} Rc \\ Gc \\ Bc \end{pmatrix} + (L) \quad (14)$$

[Formula 15]

$$(Mc) = \begin{pmatrix} X_{R255} - Xk & X_{G255} - Xk & X_{B255} - Xk \\ Y_{R255} - Yk & Y_{G255} - Yk & Y_{B255} - Yk \\ Z_{R255} - Zk & Z_{G255} - Zk & Z_{B255} - Zk \end{pmatrix} \quad (15)$$

In the image color estimation method of the second embodiment, the accurate correction signal value ST (Xc, Yc, Zc) of a display image is obtained. Accordingly, as the correction of the zero-bias value is included, an image color to be displayed on the display 5 can be estimated with higher accuracy.

WORKING EXAMPLE 1

Subsequently, a color difference between an image color estimated from predetermined image data (R, G, B) using a method according to the embodiment and an image color actually displayed as the image data (R, G, B) outputted to the display 5 was confirmed. Further, a color difference between an image color estimated from the predetermined image data (R, G, B) using a method according to a comparative example and an image color actually displayed was confirmed. As the method according to the comparative example, a method for estimating using the SMM was selected. This SMM is normally used in an ICC profile. Further, four distinct liquid crystal displays were used for the evaluation. This liquid crystal display 5 had a gamma value of 2.2. Further, as the colorimeter 9, TOPCONSR-3AL1, was used. Note that the gamma value refers to a numerical value that indicates a responsive property of the tone value T (R, G, B) of the image data. In an image display device, it is often the case that a relationship between an input value and an output value is not in a linear function but nearly identical to an exponential function. The exponent in this exponential function is referred to as the gamma value.

First, the information processing device 1 was installed in a darkroom and was left for approximately one hour after the power was turned on to stabilize the device. Then, a color standard was full-screen displayed on the liquid crystal display 5, and an output image signal value (Xs, Ys, Zs) at the center of the liquid crystal display 5 was measured using the colorimeter 9. Note that the acquired data was 35937, colors within the sRGB color gamut. The measured output image signal value (Xs, Ys, Zs) was converted into the output image signal value SG (Rs, Gs, Bs) of the RGB color specification system using the above Formula (2).

Next, with the method according to the embodiment, the output image signal value SG (Rs, Gs, Bs) of the RGB color specification system was calculated. Further, with the method according to the comparative example, an output image signal value D (RpGpBp) of the RGB color specification system was calculated. Then, a color difference between the output image signal value SG (Rs, Gs, Bs) acquired with the colorimeter 9 and the output image signal value SG (Rs, Gs, Bs) calculated through the method according to the embodiment was calculated. Further, a color difference between the output image signal value SG (Rs, Gs, Bs) acquired with the colorimeter 9 and the output image signal value D (RpGpBp) calculated through the method according to the comparative example was calculated.

FIGS. 12(a) to 12(d) illustrate results of the comparison in the respective liquid crystal displays. FIG. 12(a) illustrates the result of a display A. FIG. 12(b) illustrates the result of a display B. FIG. 12(c) illustrates the result of a display C. FIG. 12(d) illustrates the result of a display D. With reference to FIG. 12(a), the mean value of the color differences in a case of using the method according to the comparative example was 4.80. Meanwhile, the mean value of the color differences in a case of using the method according to the embodiment was 0.63. Further, the maximum value of the color differences in a case of using the method according to the comparative example was 9.99. Meanwhile, the maximum value of the color differences in a case of using the method according to the embodiment was 1.47. In addition, the standard deviation of the color differences in a case of using the method according to the comparative example was 1.83,, and the standard deviation of the color differences in a case of using the method according to the embodiment was 0.26. Through these results, it was found that the method according to the embodiment can estimate the image color on the display with higher accuracy than the method according to the comparative example.

Similar to the result pertaining to the display A described above, with the other displays B, C, and D, the estimated values obtained through the method according to the embodiment exhibited more preferable values in terms of all of the mean values, the maximum values, and the standard deviations of the color differences than the estimated values obtained through the method according to the comparative example. Further, it was found that the mean of the color differences between the image color estimated through the method according to the embodiment and the image color actually displayed on the display was 1.0, or less. Accordingly, it was found that the method according to the embodiment made it possible to estimate with high accuracy the image color displayed on the display in which additive color mixture is not realized and color tracking occurs.

INDUSTRIAL APPLICABILITY

According to the image color estimation method, the image color estimation device, and the image color estimation program of the present invention, an image color of an image displayed on a display in which additive color mixture is not realized and color tracking occurs can be estimated with high accuracy.

REFERENCE SIGNS LIST

1 . . . information processing device, 3 . . . personal computer, 5 . . . display, 7 . . . printer, 9 . . . colorimeter, 9a, . . . probe, 10 . . . memory, 20 . . . graphic processing unit, 30 . . . hard disk drive, 40 . . . image color estimation unit, 41 . . . signal value calculation unit, 42 . . . offset value calculation unit, 43 . . . signal value correction unit, 44 . . . signal value conversion unit, D1 to D21 . . . curves, P . . . display property, P1 . . . first display property, P2 . . . second display property, α, β . . . coefficients, M, Mc . . . conversion matrices, L . . . correction matrix

The invention claimed is:

1. An image color estimation method for estimating a signal value (XYZ) of an XYZ colorimetric system that indicates a device-independent color of an image displayed on a display in which additive color mixture is not realized, from a tone value (R, G, B) of an RGB color specification system inputted to the display, the image color estimation method comprising:
  receiving a measurement signal value generated by a colorimeter from an image displayed on a display, via a probe of said colorimeter which is configured to interface with the display; and
  based on the measurement signal value, carrying out the following steps:
  a first calculation step of calculating a signal value (Rs, Gs, Bs) of the RGB color specification system based on a first display property and the tone value (R, G, B),
    wherein first and second components selected from the tone values (R, G, B) are 0 and the third component is not 0;
  a second calculation step of calculating an offset value (Ro, Go, Bo) that corresponds to respective components (Rs, Gs, Bs) in the signal value based on the first display property, a second display property, and the tone value (R, G, B),
    wherein the offset value corresponds to the difference between the signal value (Rs, Gs, Bs) of the RGB color specification system and the signal value when a first selected component of the components of the tone-values (R, G, B) is 0 and the second and third components thereof are not 0;
  a third calculation step of calculating a correction signal value (Rc, Gc, Bc) of the RGB color specification system by adding the offset value (Ro, Go, Bo) to the signal value (Rs, Gs, Bs), wherein the correction signal value is the signal value (Rs, Gs, Bs) of the RGB color specification system corrected by the offset value (Ro, Go, Bo);
  a fourth calculation step of converting the correction signal value (Rc, Gc, Bc) into the signal value (Xc, Yc, Zc) using a conversion matrix, as said estimated signal value (XYZ) of said XYZ colorimetric system; and
  outputting said output signal value to a colorimetric output display device,
  wherein the first display property is a relationship between, in a case where at least one component in the tone value (R, G, B) is a variable component, the variable component in the tone value (R, G, B) and a component that corresponds to the variable component in the signal value (Rs, Gs, Bs), and
  wherein the second display property is a relationship between, in a case where two invariable components in the tone value (R, G, B) are set to fixed values and a remaining variable component is varied, the variable component in the tone value (R, G, B) and a component that corresponds to the invariable component in the signal value (Rs, Gs, Bs).

2. The image color estimation method according to claim 1, wherein the offset value (Ro, Go, Bo) is a function of the tone value (R, G, B).

3. The image color estimation method according to claim 2, wherein the offset value (Ro, Go, Bo) is a function expressed through Formula (1),

[Formula 1]

$$Co = \Delta Cs \cdot \left(\frac{C2}{C1}\right)^\alpha + \Delta C's \cdot \left(\frac{C3}{C1}\right)^\beta \quad (1)$$

wherein C1 is a first component selected from the components in the tone value (R, G, B), wherein C2 is a second component, which is different from the first component, selected from the components in the tone value (R, G, B), wherein C3 is a third component, which is different from the first component and the second component, selected from the components in the tone value (R, G, B), wherein ΔCs is a numerical value calculated based on one of the first display properties in a case where the first component is the invariable component and the second component is the variable component, wherein ΔC's is a numerical value calculated based on another first display property in a case where the first component is the invariable component and the third component is the variable component, wherein α is a coefficient of an approximation function for approximating one of the second display properties, and wherein β is a coefficient of an approximation function for approximating another second display property.

4. The image color estimation method according to claim 1, wherein the fourth step further includes a correction using a zero-bias value, and wherein the zero-bias value is a signal value (Xk, Yk, Zk) of the XYZ colorimetric system displayed on the display in a case where the tone value (R, G, B) in which each component is 0 is inputted to the display.

5. An image color estimation device for estimating a signal value (XYZ) of an XYZ colorimetric system that indicates a device-independent color of an image displayed on a display in which additive color mixture is not realized, from a tone value (R, G, B) of an RGB color specification system inputted to the display, the image color estimation device comprising a colorimeter having a probe configured to be brought to the display to acquire a measurement signal value of the image displayed on the display; and a computer which receives said measurement signal value and is programmed and configured to:

calculate a signal value (Rs, Gs, Bs) of the RGB color specification system based on a first display property and the tone value (R, G, B), wherein first and second components selected from the tone values (R, G, B) are 0 and the third component is not 0;

calculate an offset value (Ro, Go, Bo) that corresponds to respective components (Rs, Gs, Bs) in the signal value based on the first display property, a second display property, and the tone value (R, G, B), wherein the offset value corresponds to the difference between the signal value (Rs, Gs, Bs) of the RGB color specification system and the signal value when a first selected component of the components of the tone-values (R, G, B) is 0 and the second and third components thereof are not 0;

calculate a correction signal value (Rc, Gc, Bc) of the RGB color specification system by adding the offset value (Ro, Go, Bo) to the signal value (Rs, Gs, Bs), wherein the correction signal value is the signal value (Rs, Gs, Bs) of the RGB color specification system corrected by the offset value (Ro, Go, Bo);

convert the correction signal value (Rc, Gc, Bc) into the signal value (Xc, Yc, Zc) using a conversion matrix, as said estimated signal value (XYZ) of said XYZ colorimetric system; and output said output signal value to a colormetric output display device, wherein the first display property is a relationship between, in a case where at least one component in the tone value (R, G, B) is a variable component, the variable component in the tone value (R, G, B) and a component that corresponds to the variable component in the signal value (Rs, Gs, Bs), and wherein the second display property is a relationship between, in a case where two invariable components in the tone value (R, G, B) are set to fixed values and a remaining variable component is varied, the variable component in the tone value (R, G, B) and a component that corresponds to the invariable component in the signal value (Rs, Gs, Bs).

6. A color estimation program which is stored in a non-transitory computer readable medium for estimating a signal value (XYZ) of an XYZ colorimetric system that indicates a device-independent color of an image displayed on a display in which additive color mixture is not realized, from a tone value (R, G, B) of an RGB color specification system inputted to the display, the image color estimation program causes a computer to carry out the following steps:

receive a measurement signal value generated by a colorimeter from an image displayed on a display, via a probe of said colorimeter which is configured to interface with the display, and based on the measurement signal value;

calculate a signal value (Rs, Gs, Bs) of the RGB color specification system based on a first display property and the tone value (R, G, B), wherein first and second components selected from the tone values (R, G, B) are 0 and the third component is not 0;

calculate an offset value (Ro, Go, Bo) that corresponds to respective components (Rs, Gs, Bs) in the signal value based on the first display property, a second display property, and the tone value (R, G, B), wherein the offset value corresponds to the difference between the signal value (Rs, Gs, Bs) of the RGB color specification system and the signal value when a first selected component of the components of the tone-values (R, G, B) is 0 and the second and third components thereof are not 0;

calculate a correction signal value (Rc, Gc, Bc) of the RGB color specification system by adding the offset value (Ro, Go, Bo) to the signal value (Rs, Gs, Bs), wherein the correction signal value is the signal value (Rs, Gs, Bs) of the RGB color specification system corrected by the offset value (Ro, Go, Bo);

convert the correction signal value (Rc, Gc, Bc) into the signal value (Xe, Yc, Zc) using a conversion matrix, as said estimated signal value (XYZ) of said XYZ colorimetric system; and output said output signal value to a colormetric output display device, wherein the first display property is a relationship between, in a case where at least one component in the tone value (R, G, B) is a variable component, the variable component in the tone value (R, G, B) and a component that corresponds to the variable component in the signal value (Rs, Gs, Bs), and wherein the second display property is a relationship between, in a case where two invariable components in the tone value (R, G, B) are set to fixed values and a remaining variable component is varied, the variable component in the tone value (R, G, B) and a component that corresponds to the invariable component in the signal value (Rs, Gs, Bs).

* * * * *